(12) United States Patent
Srinivasa et al.

(10) Patent No.: US 8,988,979 B2
(45) Date of Patent: Mar. 24, 2015

(54) INFORMATION BIT PADDING SCHEMES FOR WLAN

(71) Applicant: Marvell World Trade Ltd., St. Michael (BB)

(72) Inventors: Sudhir Srinivasa, Sunnyvale, CA (US); Hongyuan Zhang, Fremont, CA (US); Yong Liu, Campbell, CA (US)

(73) Assignee: Marvell World Trade Ltd., St. Michael (BB)

( * ) Notice: Subject to any disclaimer, the term of this patent is extended or adjusted under 35 U.S.C. 154(b) by 105 days.

(21) Appl. No.: 13/739,657

(22) Filed: Jan. 11, 2013

(65) Prior Publication Data

US 2013/0177004 A1 Jul. 11, 2013

Related U.S. Application Data

(60) Provisional application No. 61/585,550, filed on Jan. 11, 2012, provisional application No. 61/592,519, filed on Jan. 30, 2012, provisional application No. 61/625,490, filed on Apr. 17, 2012.

(51) Int. Cl.
*H04J 11/00* (2006.01)
*H04L 27/00* (2006.01)
*H04L 5/00* (2006.01)
*H04L 29/06* (2006.01)

(52) U.S. Cl.
CPC ............ *H04L 29/0653* (2013.01); *H04L 27/00* (2013.01); *H04L 5/0091* (2013.01)
USPC ....................................................... 370/206

(58) Field of Classification Search
USPC ................... 370/208–210, 328–339, 470–476
See application file for complete search history.

(56) References Cited

U.S. PATENT DOCUMENTS

| 8,144,647 | B2 | 3/2012 | Nabar et al. |
| 8,498,245 | B2 * | 7/2013 | Wu et al. ........................ 370/328 |
| 2009/0196163 | A1 | 8/2009 | Du |
| 2010/0260159 | A1 * | 10/2010 | Zhang et al. .................. 370/338 |
| 2012/0195391 | A1 | 8/2012 | Zhang et al. |

(Continued)

FOREIGN PATENT DOCUMENTS

| WO | WO-2010/019482 A1 | 2/2010 |
| WO | WO-2010/054367 A2 | 5/2010 |

(Continued)

OTHER PUBLICATIONS

Liu et al, VHT Frame Padding, IEEE, 13 pages, Mar. 2010.*

(Continued)

*Primary Examiner* — Frank Duong

(57) ABSTRACT

In a method for generating a data unit, a signal field is generated to include a first subfield having one of: a length indication to indicate a number of bytes in a data portion of the data unit, or a duration indication to indicate a number of OFDM symbols in the data portion of the data unit and a second subfield to indicate whether the first subfield includes the length indication or the duration indication. When the first subfield includes the length indication, one or more padding bits are added to a set of information bits according to a first padding scheme. When the first subfield includes the duration indication, one or more padding bits are added to the set of information bits to according to a second padding scheme. Padded information bits are encoded, and the data unit is generated to included the encoded information bits.

22 Claims, 11 Drawing Sheets

(56) References Cited

U.S. PATENT DOCUMENTS

| | | | |
|---|---|---|---|
| 2012/0201316 A1 | 8/2012 | Zhang et al. | |
| 2012/0294294 A1* | 11/2012 | Zhang | 370/338 |
| 2012/0300874 A1 | 11/2012 | Zhang | |
| 2012/0324315 A1 | 12/2012 | Zhang et al. | |
| 2013/0128807 A1* | 5/2013 | Vermani et al. | 370/328 |

FOREIGN PATENT DOCUMENTS

| | | |
|---|---|---|
| WO | WO-2011/014685 A2 | 2/2011 |
| WO | WO-2012/122119 A1 | 9/2012 |

OTHER PUBLICATIONS

International Search Report issued in corresponding PCT/IB13/00407, mailed Oct. 8, 2013.

Written Opinion issued in corresponding PCT/IB13/00407, mailed Oct. 8, 2013.

IEEE Std 802.11-2007 (revision of IEEE Std. 802.11-1999) "Information Standard for Information technology—Telecommunications and information exchange between systems—Local and metropolitan area networks—Specific requirements," Part 11: Wireless LAN Medium Access Control (MAC) and Physical Layer (PHY) Specifications, *The Institute of Electrical and Electronics Engineers, Inc.*, (Jun. 12, 2007).

IEEE Std 802.11-2007 (redlined) "Information Standard for Information technology—Telecommunications and information exchange between systems—Local and metropolitan area networks—Specific requirements," Part 11: Wireless LAN Medium Access Control (MAC) and Physical Layer (PHY) Specifications, *The Institute of Electrical and Electronics Engineers, Inc.*, (Jun. 12, 2007).

Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, (1999).

IEEE Std 802.11b-1999/Cor 1-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, Nov. 7, 2001.

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, Apr. 2003.

IEEE Std 802.11ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Jan. 2012.

"IEEE Std. 802.11n™ IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, Oct. 2009.

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, (Jun. 12, 2007).

IEEE Std 802.11ac/D2.1 "Draft Standard for Information Technology—Telecommunications and information exchange between systems—Local and metropolitan area networks-Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Mar. 2012.

Stacey et al., "Specification Framework for TGac," document No. IEEE 802.11-09/0992r20, *Institute for Electrical and Electronics Engineers*, pp. 1-49, Jan. 18, 2011.

IEEE Std 802.11af/D1.05 "Draft Standard for Information Technology-Telecommunications and information exchange between systems-Local and metropolitan area networks-Specific requirements, Part 11: Wireless LAN Medium Access Control (MAC) and Physical Layer (PHY) specifications: Amendment 4: TV White Spaces Operation," *The Institute of Electrical and Electronics Engineers, Inc.*, pp. 1-123 (Nov. 2011).

Lee et al., "TGaf PHY proposal," *The Institute of Electrical and Electronics Engineers*, doc. No. IEEE 802.11-12/0809r5, pp. 1-43, Jul. 10, 2012.

Yu et al., "Coverage extension for IEEE802.11ah," *The Institute of Electrical and Electronics Engineers*, doc. No. IEEE 802.11-11/0035r1, pp. 1-10 (Jan. 2011).

Taghavi et al., "Introductory Submission for TGah", doc. No. IEEE 802.11-11/0062r0, *Institute for Electrical and Electronics Engineers*, pp. 1-5 (Jan. 14, 2011).

de Vegt, "Potential Compromise for 802.11 ah Use Case Document", Institute of Electrical and Electronics Engineers, doc. No. IEEE 802.11-11/0457r0, pp. 1-27 (Mar. 2011).

Zhang et al., "11 ah Data Transmission Flow," *The Institute of Electrical and Electronics Engineers*, doc. No. IEEE 802.11-11/1484r1, pp. 1-15 (Nov. 2011).

Park, "Proposed Specification Framework for TGah", *The Institute of Electrical and Electronics Engineers*, doc. No. IEEE 802.11-11/1137r6, pp. 1-13 (Mar. 2012).

Park, "Proposed Specification Framework for TGah D9.x", *The Institute of Electrical and Electronics Engineers*, doc. No. IEEE 802.11-yy/xxxxr0, pp. 1-30 (Jul. 2012).

Vermani, et al. "Preamble Format for 1 MHz," *The Institute of Electrical and Electronics Engineers*, doc. No. IEEE 802.11-11/1482r2, pp. 1-30 (Nov. 2011).

Zhang et al., "1 MHz Waveform in Wider BW", *The Institute of Electrical and Electronics Engineers*, doc. No. IEEE 802.11-12/0309r1, pp. 1-10 (Mar. 2012).

Vermani, et al. "Spec Framework Text for PHY Numerology," *The Institute of Electrical and Electronics Engineers*, doc. No. IEEE 802.11-11/1311r0, pp. 1-5 (Sep. 2011).

Park, "Proposed Specification Framework for TGah", *The Institute of Electrical and Electronics Engineers*, doc. No. IEEE 802.11-11/1137r11, pp. 1-36 (Sep. 2012).

Park, "Specification Framework for TGah," *The Institute of Electrical and Electronics Engineers*, doc. No. IEEE 802.11-11/1137r13, pp. 1-58 (Jan. 14, 2013).

Zhang et al., "Beamforming Feedback for Single Stream," *The Institute of Electrical and Electronics Engineers*, doc. No. IEEE 802.11-12/1312r0, pp. 1-22 (Nov. 12, 2012).

Shao, "Channel Selection for 802.11ah," doc.: IEEE 802.11-12/0816r0, pp. 1-11 (Jul. 2012).

* cited by examiner

INFORMATION BIT PADDING SCHEMES FOR WLAN

CROSS-REFERENCES TO RELATED APPLICATIONS

This disclosure claims the benefit of the following U.S. Provisional Patent Applications:

U.S. Provisional Patent Application No. 61/585,550, entitled "Padding/Tail bits flow for 11ah," filed on Jan. 11, 2012;

U.S. Provisional Patent Application No. 61/592,519, entitled "Padding/Tail bits flow for 11ah," filed on Jan. 30, 2012; and U.S. Provisional Patent Application No. 61/625,490, entitled "Padding/Tail bits flow for 11ah," filed on Apr. 17, 2012.

The disclosures of all of the patent applications referenced above are incorporated herein by reference.

FIELD OF THE DISCLOSURE

The present disclosure relates generally to communication networks and, more particularly, to long range low power wireless local area networks.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

When operating in an infrastructure mode, wireless local area networks (WLANs) typically include an access point (AP) and one or more client stations. WLANs have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the Gbps range.

Work has begun on a two new standards, IEEE 802.11ah and IEEE 802.11af, each of which will specify wireless network operation in sub-1 GHz frequencies. Low frequency communication channels are generally characterized by better propagation qualities and extended propagation ranges compared to transmission at higher frequencies. In the past, sub-1 GHz ranges have not been utilized for wireless communication networks because such frequencies were reserved for other applications (e.g., licensed TV frequency bands, radio frequency band, etc.). There are few frequency bands in the sub 1-GHz range that remain unlicensed, with different specific unlicensed frequencies in different geographical regions. The IEEE 802.11 ah Standard will specify wireless operation in available unlicensed sub-1 GHz frequency bands. The IEEE 802.11af Standard will specify wireless operation in TV White Space (TVWS), i.e., unused TV channels in sub-1 GHz frequency bands.

SUMMARY

In an embodiment, a method for generating an orthogonal frequency division multiplexing (OFDM) physical layer (PHY) data unit for transmission via a communication channel includes generating a signal field to include a first subfield having one of i) a length indication to indicate a number of bytes in a data portion of the data unit, or ii) a duration indication to indicate a number of OFDM symbols in the data portion of the data unit and a second subfield to indicate whether the first subfield includes the length indication or the duration indication. The method also includes when the second subfield indicates that the first subfield includes the length indication, adding one or more padding bits to a set of information bits to generate a set of padded information bits according to a first padding scheme, and when the second subfield indicates that the first subfield includes the duration indication, adding one or more padding bits to the set of information bits to generate the set of padded information bits according to a second padding scheme, the second padding scheme different than the first padding scheme. The method further includes encoding the set of padded information bits with one or more binary convolutional coding (BCC) encoders to generate a set of encoded information bits. The method additionally includes generating a plurality of OFDM symbols to include the set of encoded information bits and generating the data unit to include the plurality of OFDM symbols.

In another embodiment, an apparatus for generating a PHY data unit for transmission via a communication channel comprises a network interface. The network is configured to generate a signal field to include a first subfield to having one of i) a length indication to indicate a number of bytes in a data portion of the data unit, or ii) a duration indication to indicate a number of OFDM symbols in the data portion of the data unit and a second subfield to indicate whether the first subfield includes the length indication or the duration indication. The network interface is also configured to when the second subfield indicates that the first subfield includes the length indication, add one or more padding bits to a set of information bits to generate a set of padded information bits according to a first padding scheme, and when the second subfield indicates that the first subfield includes the duration indication, add one or more padding bits to the set of information bits to generate the set of padded information bits according to a second padding scheme, the second padding scheme different than the first padding scheme. The network interface is further configured to encode the set of padded information bits with one or more binary convolutional coding (BCC) encoders to generate a set of encoded information bits. The network interface is additionally configured to generate a plurality of OFDM symbols to include the set of encoded information bits and generate the data unit to include the plurality of OFDM symbols.

In yet another embodiment, a method for generating an orthogonal frequency division multiplexing (OFDM) physical layer (PHY) data unit for transmission via a communication channel includes generating a signal field to include a first subfield having one of i) a length indication to indicate a number of bytes in a data portion of the data unit, or ii) a duration indication to indicate a number of OFDM symbols in the data portion of the data unit and a second subfield to indicate whether the first subfield includes the length indication or the duration indication. The method also includes when the second subfield indicates that the first subfield includes the length indication, adding one or more padding bits to a set of information bits to generate a set of padded information bits according to a first padding scheme, and when the second subfield indicates that the first subfield includes the duration indication, adding one or more padding bits to the set of information bits to generate the set of padded information bits according to a second padding scheme, the second padding scheme different than the first padding scheme. The method further includes encoding the set of padded information bits with one or more low density parity check (LDPC) encoders to generate a set of encoded information bits. The method additionally includes generating a plurality of OFDM symbols to include the set of encoded information bits and generating the data unit to include the plurality of OFDM symbols.

In still another embodiment, an apparatus for generating a PHY data unit for transmission via a communication channel comprises a network interface. The network interface is configured to generate a signal field to include a first subfield to include one of i) a length indication to indicate a number of bytes in a data portion of the data unit and ii) a duration indication to indicate a number of OFDM symbols in the data portion of the data unit and a second subfield to indicate whether the first subfield includes the length indication or the duration indication. The network interface is also configured to when the second subfield indicates that the first subfield includes the length indication, add one or more padding bits to a set of information bits to generate a set of padded information bits according to a first padding scheme and when the second subfield indicates that the first subfield includes the duration indication, add one or more padding bits to the set of information bits to generate the set of padded information bits according to a second padding scheme, the second padding scheme different than the first padding scheme. The network interface is further configured to encode the set of padded information bits with one or more low density parity check (LDPC) encoders to generate a set of encoded information bits. The network interface is additionally configured to generate a plurality of OFDM symbols to include the set of encoded information bits and generate the data unit to include the plurality of OFDM symbols.

DETAILED DESCRIPTION

In embodiments described below, a wireless network device such as an access point (AP) of a wireless local area network (WLAN) transmits data streams to one or more client stations. The AP is configured to operate with client stations according to at least a first communication protocol. The first communication protocol defines operation in a sub 1 GH frequency range, and is typically used for applications requiring long range wireless communication with relatively low data rates. The first communication protocol (e.g., IEEE 802.11af or IEEE 802.11ah) is referred to herein as a "long range" communication protocol. In some embodiments, the AP is also configured to communicate with client stations according to one or more other communication protocols which define operation in generally higher frequency ranges and are typically used for closer-range communications with higher data rates. The higher frequency communication protocols (e.g., IEEE 802.11a, IEEE 802.11n, and/or IEEE 802.11 ac) are collectively referred to herein as "short range" communication protocols.

In some embodiments, the physical layer (PHY) data units conforming to the long range communication protocol ("long range data units") are the same as or similar to data units conforming to a short range communication protocol ("short range data units"), but are generated using a lower clock rate. To this end, in an embodiment, the AP operates at a clock rate suitable for short range operation, and down-clocking is used to generate a clock to be used for the sub 1 GHz operation. As a result, in this embodiment, a data unit that conforms to the long range communication protocol ("long range data unit") maintains a physical layer format of a data unit that conforms to a short range communication protocol ("short range data unit"), but is transmitted over a longer period of time. In addition to this "normal mode" specified by the long range communication protocol, in some embodiments, the long range communication protocol also specifies a "control mode" with a reduced data rate compared to the lowest data rate specified for the normal mode. Because of the lower data rate, the control mode further extends communication range and generally improves receiver sensitivity. In some embodiments, the AP utilizes the control mode in signal beacon or association procedures and/or in transmit beamforming training operations, for example. Additionally or alternatively, the AP utilizes the control mode in situations in which longer range transmission is needed and a lower data rate is acceptable, such as, for example, to communicate with a smart meter or a sensor which periodically transmits small amounts of data (e.g., measurement readings) over a long distance.

Figure 1:
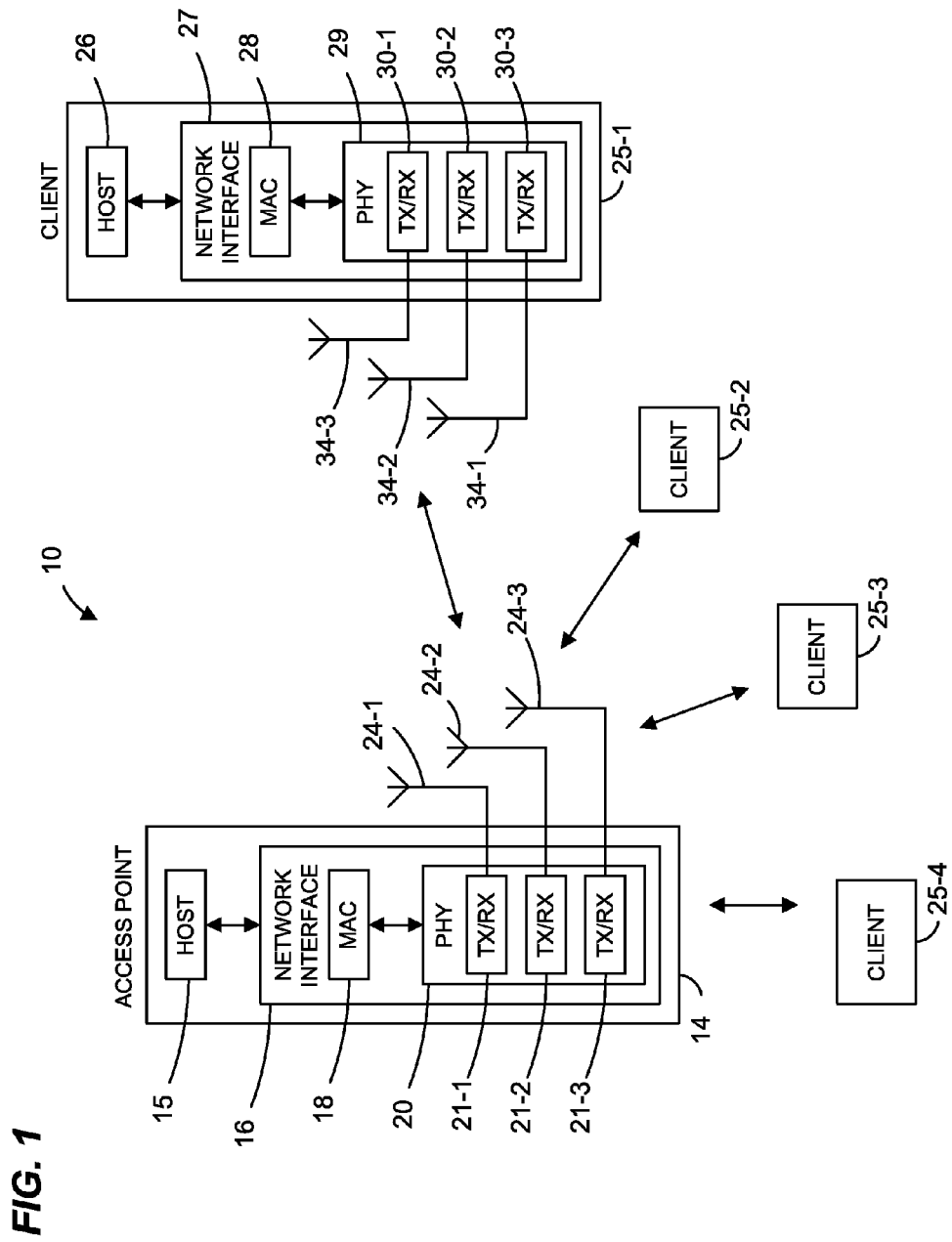
FIG. 1 is a block diagram of an example wireless local area network (WLAN) 10, according to an embodiment.

FIG. 1 is a block diagram of an example wireless local area network (WLAN) 10, according to an embodiment. An AP 14 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 can include different numbers (e.g., 1, 2, 4, 5, etc.) of transceivers 21 and antennas 24 in other embodiments.

The WLAN 10 includes a plurality of client stations 25. Although four client stations 25 are illustrated in FIG. 1, the WLAN 10 can include different numbers (e.g., 1, 2, 3, 5, 6, etc.) of client stations 25 in various scenarios and embodiments. At least one of the client stations 25 (e.g., client station 25-1) is configured to operate at least according to the long range communication protocol. In some embodiments, at least one of the client stations 25 (e.g., client station 25-4) is a short range client station that is configured to operate at least according to one or more of the short range communication protocols.

The client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 can include different numbers (e.g., 1, 2, 4, 5, etc.) of transceivers 30 and antennas 34 in other embodiments.

In an embodiment, one or both of the client stations 25-2 and 25-3, has a structure the same as or similar to the client station 25-1. In an embodiment, the client station 25-4, has a structure similar to the client station 25-1. In these embodiments, the client stations 25 structured the same as or similar to the client station 25-1 have the same or a different number of transceivers and antennas. For example, the client station 25-2 has only two transceivers and two antennas (not shown), according to an embodiment.

In various embodiments, the PHY processing unit 20 of the AP 14 is configured to generate data units conforming to the long range communication protocol and having formats described hereinafter. The transceiver(s) 21 is/are configured to transmit the generated data units via the antenna(s) 24. Similarly, the transceiver(s) 24 is/are configured to receive data units via the antenna(s) 24. The PHY processing unit 20 of the AP 14 is configured to process received data units conforming to the long range communication protocol and having formats described hereinafter, according to various embodiments.

In various embodiments, the PHY processing unit 29 of the client device 25-1 is configured to generate data units conforming to the long range communication protocol and having formats described hereinafter. The transceiver(s) 30 is/are configured to transmit the generated data units via the antenna(s) 34. Similarly, the transceiver(s) 30 is/are configured to receive data units via the antenna(s) 34. The PHY processing unit 29 of the client device 25-1 is configured to process received data units conforming to the long range communication protocol and having formats described hereinafter, according to various embodiments.

In some embodiments, the AP 14 is configured to operate in dual band configurations. In such embodiments, the AP 14 is able to switch between a short range mode and a long range mode of operation. According to one such embodiment, when operating in short range mode, the AP 14 transmits and receives data units that conform to one or more of the short range communication protocols. When operating in a long range mode, the AP 14 transmits and receives data units that conform to the long range communication protocol. Similarly, the client station 25-1 is capable of dual frequency band operation, according to some embodiments. In these embodiments, the client station 25-1 is able to switch between short range and long range modes of operation. In other embodiments, the AP 14 and/or the client station 25-1 is dual band device that is able to switch between different low frequency bands defined for long range operations by the long range communication protocol. In yet another embodiment, the AP 14 and/or the client station 25-1 is single band device configured to operate in only one long range frequency band.

Figure 2:
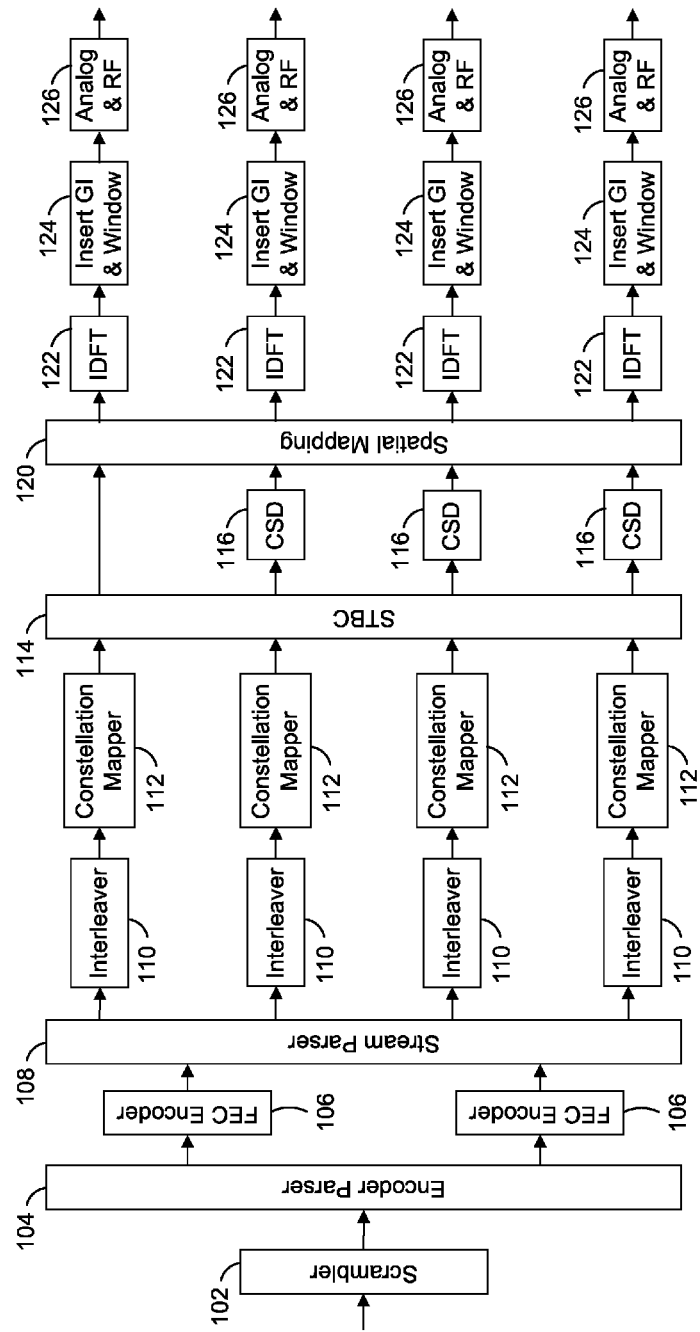
FIG. 2 is a block diagram of a transmit portion of an example PHY processing unit for generating normal mode data units, according to an embodiment.

FIG. 2 is a block diagram of a transmit portion of an example PHY processing unit 100 for generating normal mode data units, according to an embodiment. Referring to FIG. 1, the PHY processing unit 20 of AP 14 and the PHY processing unit 29 of client station 25-1 are each similar to or the same as PHY processing unit 100, in one embodiment. The PHY processing unit 100 includes a scrambler 102 that generally scrambles an information bit stream to reduce occurrences of long sequences of ones or zeros, according to an embodiment. An encoder parser 104 is coupled to the scrambler 102. The encoder parser 208 demultiplexes the information bit stream into one or more encoder input streams corresponding to one or more forward error correction (FEC) encoders 106.

While two FEC encoders 106 are shown in FIG. 2, different numbers of FEC encoders are included, and/or different numbers of FEC encoders operate in parallel, in various other embodiments and/or scenarios. For example, according to one embodiment, the PHY processing unit 100 includes four FEC encoders 106, and one, two, three, or four of the FEC encoders 106 operate simultaneously depending on the particular modulation and coding scheme (MCS), bandwidth, and number of spatial streams. Each FEC encoder 106 encodes the corresponding input stream to generate a corresponding encoded stream. In one embodiment, each FEC encoder 106 includes a binary convolutional coder (BCC). In another embodiment, each FEC 106 encoder includes a BCC followed by a puncturing block. In another embodiment, each FEC encoder 106 includes a low density parity check (LDPC) encoder.

A stream parser 108 parses the one or more encoded streams into one or more spatial streams (e.g., four streams in the example PHY processing unit 100 shown in FIG. 2) for separate interleaving and mapping into constellation points/symbols. In one embodiment, the stream parser 108 operates according to the IEEE 802.11n communication protocol, such that the following equation is satisfied:

$$s = \max\left\{1, \frac{N_{BPSCS}}{2}\right\} \quad \text{Equation 1}$$

where s is the number of coded bits assigned to a single axis in a constellation point for each of $N_{SS}$ spatial streams, and where $N_{BPSCS}$ is the number of bits per subcarrier. For each FEC encoder 106 (whether BCC or LDPC), consecutive blocks of s coded bits are assigned to different spatial streams in a round robin fashion, in an embodiment. In some embodiments where the set of FEC encoders 106 includes two or more BCC encoders, the outputs of the individual FEC encoders 106 are used in an alternating fashion for each round-robin cycle, i.e., initially S bits from the first FEC encoder 106 are fed into $N_{SS}$ spatial streams, then S bits from the second FEC encoder 106 are fed into the $N_{SS}$ spatial streams, and so on, where:

$$S = N_{SS} \times s \quad \text{Equation 2}$$

Corresponding to each of the $N_{SS}$ spatial streams, an interleaver 110 interleaves bits of the spatial stream (i.e., changes the order of the bits) to prevent long sequences of adjacent noisy bits from entering a decoder at the receiver. More specifically, the interleaver 110 maps adjacent coded bits onto non-adjacent locations in the frequency domain or in the time domain. The interleaver 110 operates according to the IEEE 802.11n communication protocol (i.e., two frequency permutations in each data stream, and a third permutation to cyclically shift bits differently on different streams), in an embodiment, with the exception that the parameters $N_{col}$, $N_{row}$, and $N_{rot}$ (i.e., number of columns, number of rows, and frequency rotation parameter, respectively) are suitable values based on the bandwidth of the long range, normal mode data units.

Also corresponding to each spatial stream, a constellation mapper 112 maps an interleaved sequence of bits to constellation points corresponding to different subcarriers/tones of an OFDM symbol. More specifically, for each spatial stream, the constellation mapper 112 translates every bit sequence of length $\log_2(M)$ into one of M constellation points, in an embodiment. The constellation mapper 112 handles different numbers of constellation points depending on the MCS being utilized. In an embodiment, the constellation mapper 112 is a quadrature amplitude modulation (QAM) mapper that handles M=2, 4, 16, 64, 256, and 1024. In other embodiments, the constellation mapper 112 handles different modulation schemes corresponding to M equaling different subsets of at least two values from the set {2, 4, 16, 64, 256, 1024}.

In an embodiment, a space-time block coding (STBC) unit 114 receives the constellation points corresponding to the one or more spatial streams and spreads the spatial streams to a number ($N_{STS}$) of space-time streams. In some embodiments, the STBC unit 114 is omitted. Cyclic shift diversity (CSD) units 116 are coupled to the STBC unit 114. The CSD units 116 insert cyclic shifts into all but one of the space-time streams (if more than one space-time stream) to prevent unintentional beamforming. For ease of explanation, the inputs to the CSD units 116 are referred to as space-time streams even in embodiments in which the STBC unit 114 is omitted.

A spatial mapping unit 120 maps the $N_{STS}$ space-time streams to $N_{TX}$ transmit chains. In various embodiments, spatial mapping includes one or more of: 1) direct mapping, in which constellation points from each space-time stream are mapped directly onto transmit chains (i.e., one-to-one mapping); 2) spatial expansion, in which vectors of constellation points from all space-time streams are expanded via matrix multiplication to produce inputs to the transmit chains; and 3) beamforming, in which each vector of constellation points from all of the space-time streams is multiplied by a matrix of steering vectors to produce inputs to the transmit chains. Each output of the spatial mapping unit 120 corresponds to a transmit chain, and each output of the spatial mapping unit 120 is operated on by an IDFT calculation unit 122 (e.g., an inverse fast Fourier transform (IFFT) calculation unit) that converts a block of constellation points to a time-domain signal. Outputs of the IDFT units 122 are provided to GI insertion and windowing units 124 that prepend to OFDM symbols, a guard interval (GI) portion, which is a circular extension of an OFDM symbol in an embodiment, and smooth the edges of OFDM symbols to increase spectral delay. Outputs of the GI insertion and windowing units 124 are provided to analog and radio frequency (RF) units 126 that convert the signals to analog signals and upconvert the signals to RF frequencies for transmission. The signals are transmitted in a 2 MHz, a 4 MHz, an 8 MHz, or a 16 MHz bandwidth channel (e.g., corresponding to a 64-, 128-, 256-, or 512-point IDFT at unit 122, respectively, and utilizing a clock rate that is constant regardless of IDFT size), in various embodiments and/or scenarios. In other embodiments, other suitable channel bandwidths (and/or IDFT sizes) are utilized. Long range data units corresponding to the normal mode are discussed in more detail in U.S. patent application Ser. No. 13/359,336, filed on Jan. 6, 2012 and entitled "Physical Layer Frame Format for Long Range WLAN," which is hereby incorporated by reference herein in its entirety.

Figure 3:
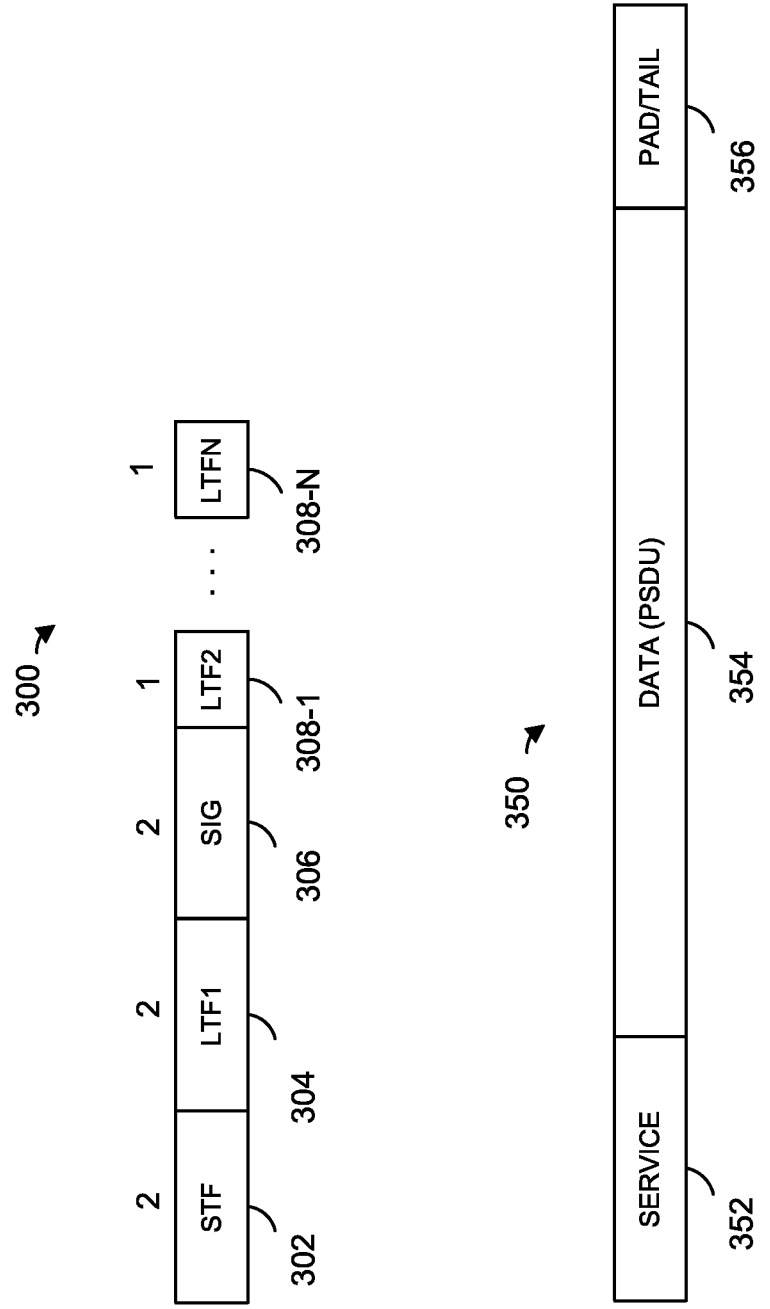
FIG. 3 is a diagram of a long range normal mode OFDM data unit, according to an embodiment.

FIG. 3 is a diagram of a long range normal mode OFDM data unit 300 that the AP 14 is configured to transmit to the client station 25-4 via orthogonal frequency division multiplexing (OFDM) modulation, according to an embodiment. In an embodiment, the client station 25-4 is also configured to transmit the data unit 300 to the AP 14. The data unit 300 includes a preamble having a short training field (STF) 302, a first long training field (LTF1) 304, a signal field (SIG) 406, and M data LTFs 308, where M is an integer which generally corresponds to a number of spatial streams used to transmit the data unit 300 in a multiple input multiple output (MIMO) channel configuration. The short training field 302 is generally used for packet detection, initial synchronization, and automatic gain control, etc., and the plurality of long training fields 204 are generally used for channel estimation and fine synchronization, in an embodiment. The signal field 306 is generally used to carry various physical layer (PHY) parameters of with the data unit 300, such as modulation type and coding rate used to transmit the data unit 300, for example. In some embodiments, the data unit 300 also includes a data portion 350. In an embodiment, the data portion 350 includes a service field 352, a scrambled physical layer service data unit (PSDU) portion 354 and a tail bits/padding bits portion that includes tail and/or padding bits, if needed. In some embodiments, the data unit 300 includes additional fields that are not illustrated in FIG. 3. For example, the data unit 300 includes an additional signal field. The additional signal field is positioned after LTFs 308 and before the data portion 350, for example, in one embodiment.

In an embodiment, in addition to normal mode of operation, the AP 14 and/or the client stations 25 are configured to operate in a low bandwidth mode, in some situations. Low bandwidth mode communications are generally more robust than normal mode communications, having a sensitivity gain that supports extended range communications. For example, in an embodiment in which the normal mode utilizes a 64-point IDFT (e.g., for a 2 MHz bandwidth signal) to generate normal mode data units, and in which the low bandwidth mode utilizes a 32-point IDFT (e.g., for a 1 MHz bandwidth signal) to generate low bandwidth mode data units, the low bandwidth mode provides approximately a 3 dB sensitivity gain. In some embodiments, the low bandwidth mode introduces redundancy or repetition of bits into at least some fields of the data unit to further reduce the data rate. For example, in various embodiments and/or scenarios, the low bandwidth mode introduces redundancy into the data portion and/or the signal field of a low bandwidth mode data unit according to one or more repetition and coding schemes described below. In an embodiment where the low bandwidth mode includes a 2× repetition of bits, for example, a 3 dB sensitivity gain may be obtained. Still further, in some embodiments, the low bandwidth mode improves sensitivity by generating OFDM symbols in accordance with the lowest data rate MCS of the normal mode, or in accordance with an MCS lower than the lowest data rate MCS of the normal mode. As an example, in an embodiment, data units in normal mode are generated according to a particular MCS selected from a set of MCSs, such as MCS0 (binary phase shift keying (BPSK) modulation and coding rate of 1/2) to MCS9 (quadrature amplitude modulation (QAM) and coding rate of 5/6), with higher order MCSs corresponding to higher data rates. In one such embodiment, the low bandwidth mode data units are generated using modulation and coding as defined by MCS0. In an alternative embodiment, MCS0 is reserved for low bandwidth mode data units only, and cannot be used for normal mode data units. Low bandwidth data unit utilized in some embodiments of the present disclosure are described in described in more detail in U.S. patent application Ser. No. 13/366,064, filed on Feb. 3, 2012 and entitled "Control Mode PHY for WLAN," which is hereby incorporated by reference herein in its entirety. Low bandwidth mode data units utilized in some embodiments are also described in U.S. patent application Ser. No. 13/494,505, filed on Jun. 12, 2012 and entitled "Low Bandwidth PHY for WLAN," which is hereby incorporated by reference herein in its entirety.

Figure 4:
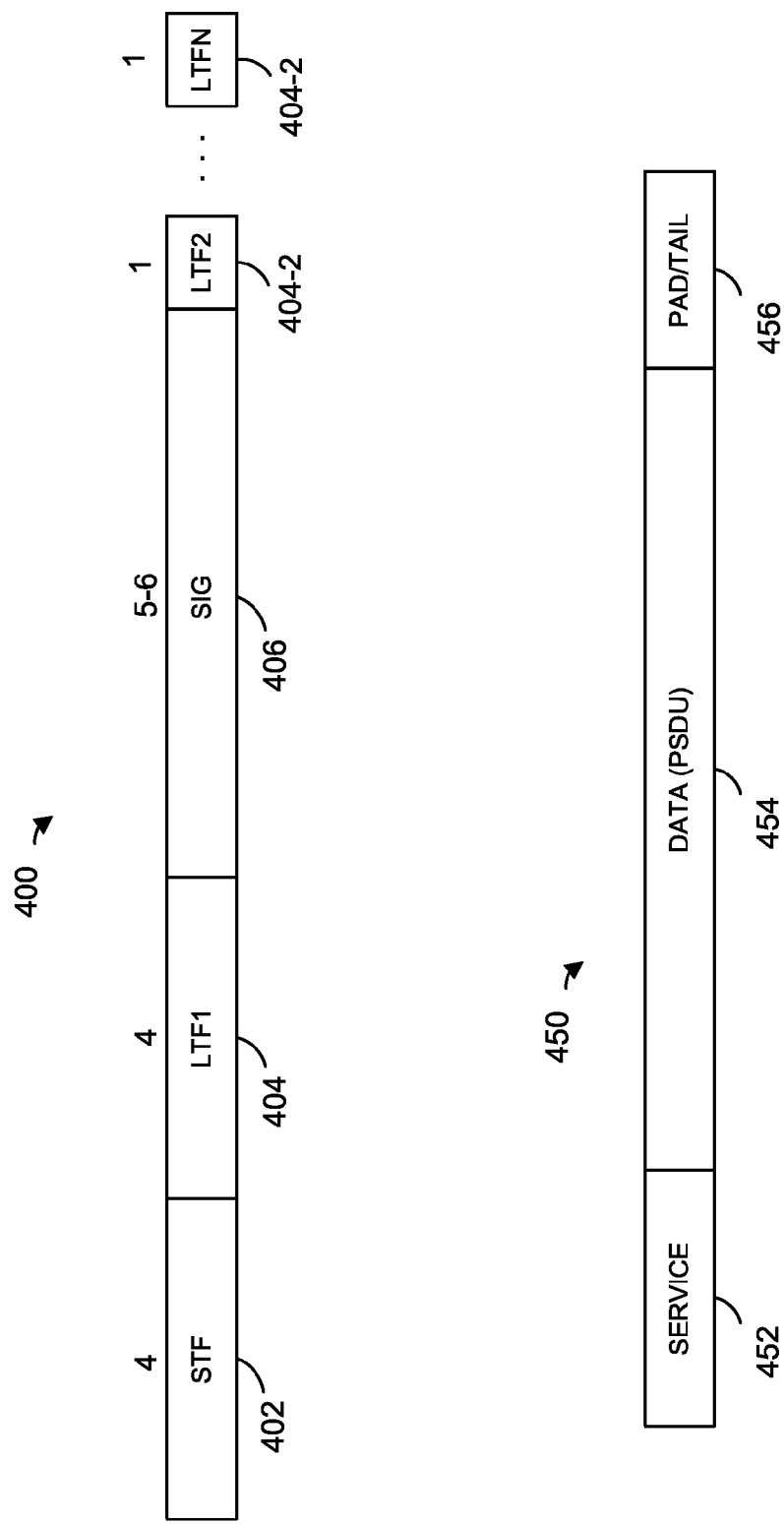
FIG. 4 is a diagram of a long range low bandwidth mode OFDM data unit, according to an embodiment.

FIG. 4 is a diagram of a long range low bandwidth mode OFDM data unit 400, according to an embodiment. In an embodiment, the AP 14 is configured to transmit to the client station 25-4 via orthogonal frequency division multiplexing (OFDM) modulation, according to an embodiment. Similarly, the client station 25-4 is configured to transmit the data unit 400 to the AP 14, in an embodiment. The data unit 400 is generally similar to the normal data unit 300 of FIG. 3, except that the data unit 400 is according to a low bandwidth mode format, such as an MCS0-Rep2 mode format which utilizes MCS0 with a 2× block repetition scheme. Similar, to the normal mode data unit 300 of FIG. 3, the low bandwidth mode data unit 400 a preamble having a short training field (STF) 402, a first long training field (LTF1) 404, a signal field (SIG) 406, and M data LTFs 408, where M is an integer which generally corresponds to a number of spatial streams used to transmit the data unit 400 in a multiple input multiple output (MIMO) channel configuration. However, the short training field 402, the long training 404 and the signal field 406 are longer compared to the corresponding fields in the normal mode data unit 300 of FIG. 3. In some embodiments, the data unit 400 also includes a data portion 450 having a service field 452, a PSDU portion 454 and pad and/or tail bits included in a pad/tail field 456 if needed. The data portion 450 follows the long training fields 408, in an embodiment. The data portion 450 is generated using MCS0 and a 2× block repetition, in an embodiment. In some embodiments, the data unit 400 includes additional fields that are not illustrated in FIG. 4. For example, the data unit 400 includes an additional signal field, in one embodiment.

According to an embodiment, data units formatted according to the long range communication protocol (normal mode or low bandwidth mode) include an indication of the length of the data unit, for example in a signal field included in a preamble of the data unit. In some situations, the data unit length is signaled in terms of the number of bytes of data included in the data unit. In other situations, the data unit length is signaled in terms of the number of OFDM symbols included in the data unit. The number of OFDM symbols signaling is utilized, for example, when the number of bits or bytes in the data unit is relatively large, and signaling the length of the data unit in terms of bytes becomes impractical, e.g. by requiring too many bits to be used to indicate the data unit length. To allow a receiver to determine the mode of data unit length signaling being utilized (e.g., data unit length signaled in terms of byte of data or in terms of OFDM symbols), the signal field of the data unit also included an indication of the data unit length signaling node being utilized.

Figure 5:
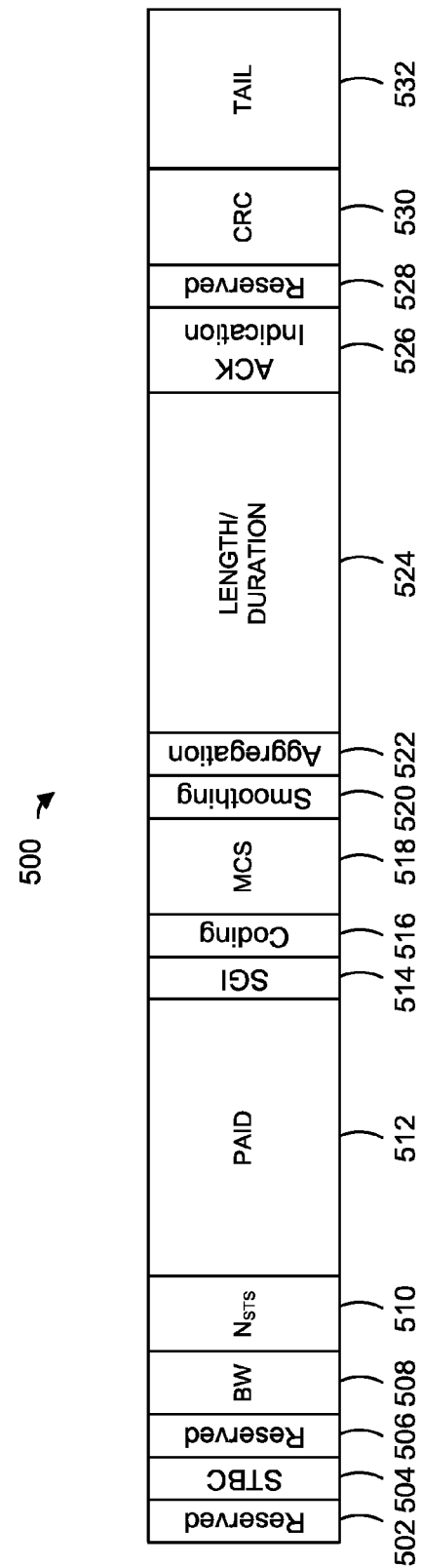
FIG. 5 is a diagram of an example signal field of a normal mode long range data unit, according to an embodiment.

FIG. 5 is a diagram of an example normal mode signal field 500 of a normal mode long range data unit, according to an embodiment. The signal field 500 corresponds to the signal field 306 of FIG. 3, in an embodiment. In another embodiment, the signal field 500 is included in a normal mode data unit different than the data unit 300 of FIG. 3. Similarly, the signal field 306 of FIG. 3 is different than the signal field 500, in some embodiments. As shown in FIG. 5, the SIG field 500 includes a plurality of subfields. The plurality of subfields includes a first reserved subfield 502, a space-time block coding (STBC) subfield 504, a second reserved subfield 506, a bandwidth (BW) subfield 508, a number of space-time streams (Nsts) subfield 510, a partial association identification (PAID) subfield 512, a sort guard interval subfield 514, a coding subfield 516, a modulation and coding scheme (MCS) subfield 518, a smoothing subfield 520, an aggregation subfield 525, a Length/Duration subfield 524, an acknowledgement (ACK) indication subfield 526, a third reserved subfield 528, a cyclic redundancy check (CRC) subfield 530 and a tail subfield 532.

In some embodiments, some subfields of the signal field 500 are replaced with different subfields and/or the signal field 500 includes additional subfields not illustrated in FIG. 5. For example, in some embodiment, the signal field 500 includes a single user/multi-user (SU/MU) subfield to indicate whether the data unit that includes the signal field 500 is a single user data unit intended for a single client station 25 or a multi user data unit that includes information intended for each one of a plurality of client stations 25. As another example, in an embodiment, the signal field 500 includes a beam-change indication bit to indicate whether a spatial stream mapping matrix used in generating the data unit that includes the signal field 500 has been changed. In some embodiments, the signal field 500 omits some of the subfields 502 illustrated in FIG. 5. For example, in some embodiments, the soothing subfield 520 is omitted from the signal field 500, for example when smoothing is not recommended and/or is not utilized for transmission of the data unit that includes the signal field 500. In an embodiment, a normal mode data unit, such as the data unit 300 of FIG. 3 can include a short preamble format or a long preamble, and the signal field 304 of the data unit 300 can be different depending on the preamble format used for the data unit 300.

In an embodiment, the length/duration subfield 524 of the signal field 500 is used to indicate a length or a duration of a data portion of the data unit that includes the signal field 500 (e.g., a length or a duration of the data portion 350 of FIG. 3). In some situations, the length/duration subfield 524 includes a length indication, or an indication of a number of bytes contained in a data portion (e.g., the data portion 350). In other situations, the length/duration subfield 524 includes a duration indication, or an indication of a OFDM symbols contained in a data portion (e.g., the data portion 350). A receiving device is able to determine whether the subfield 524 should be interpreted as containing a length indication or a duration indication based on the value of the aggregation subfield 522 of the signal field 500, in an embodiment. For example, the aggregation subfield 522 is a one bit subfield, and a device transmitting a data unit that includes the signal field 500 sets the aggregation bit to a value of 0 to indicate that the length/duration subfield 524 includes a length indication, and sets the aggregation bit to a value of 1 to indicate that the length/duration subfield 524 includes a duration indication, or vice versa.

The coding subfield 516 indicates whether a data portion of the data unit that includes the signal field 500 is encoded using a BCC encoder or an LDPC encoder. For example, the coding subfield 516 is a one bit subfield, and a transmitting device sets the coding bit to a value of 0 to indicate that the data portion is BCC encoded, and sets the coding bit to a value of 1 to indicate that the data portion is LDPC encoded, or vice versa. In another embodiment, the coding subfield 516 includes an additional bit to indicate whether an additional OFDM symbol is used to LDPC encode the data portion, as will be explained in more detail below.

Figure 6:
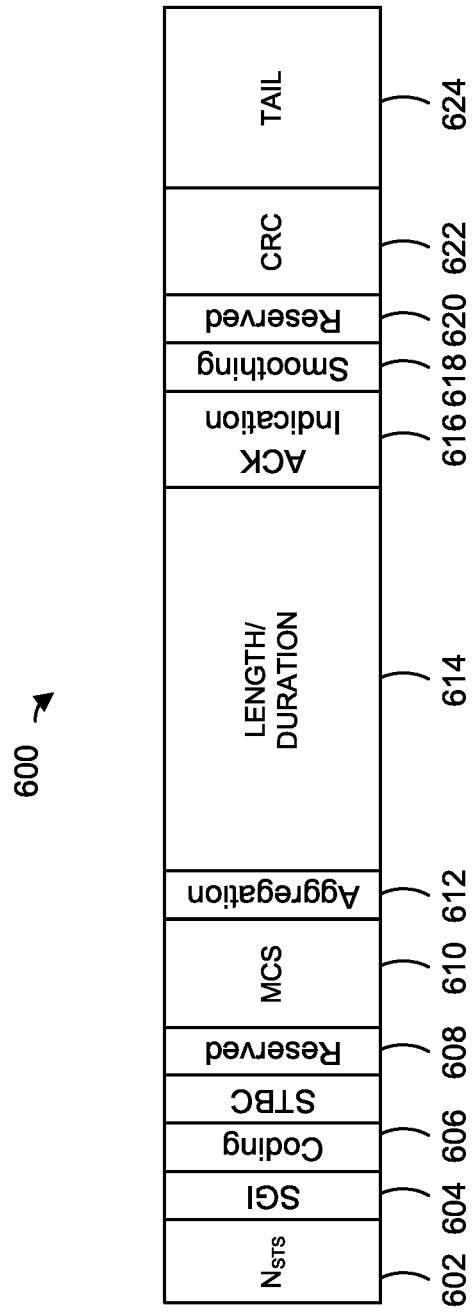
FIG. 6 is a diagram of an example signal field of a low bandwidth mode long range data unit, according to an embodiment.

FIG. 6 is a diagram of an example low bandwidth mode signal field 600 of a low bandwidth mode long range data unit, according to an embodiment. The signal field 600 corresponds to the signal field 406 of FIG. 4, in an embodiment. In another embodiment, the signal field 600 is included in a low bandwidth mode data unit different than the data unit 400 of FIG. 4. Similarly, the signal field 406 of FIG. 4 is different than the signal field 600, in some embodiments. As shown in FIG. 6, the SIG field 600 includes a plurality of subfields. The plurality of subfields include a number of space-time streams (Nsts) subfield 602, a short guard interval (SGI) subfield 604, a coding subfield 606, a space-time block coding (STBC) subfield 606, a reserved subfield 608, a modulation and coding (MCS) subfield 610, an aggregation subfield 612, a Length/Duration subfield 614, an acknowledgement (ACK) indication subfield 616, a smoothing subfield 618, a second reserved subfield 620, a cyclic redundancy check (CRC) subfield 622 and a tail subfield 624. In some embodiments, some of the subfields 602-624 are omitted from the signal field 600 and/or some additional subfields that are not illustrated in FIG. 6 are included in the signal field 600.

In an embodiment, the length/duration subfield 614 of the signal field 600 is used to indicate a length or a duration of a data portion of the data unit that includes the signal field 600 (e.g., a length or a duration of the data portion 450 of FIG. 4). In some situations, the length/duration subfield 614 includes a length indication, or an indication of a number of bytes contained in a data portion (e.g., the data portion 450). In other situations, the length/duration subfield 614 includes a duration indication, or an indication of a number of OFDM symbols contained in a data portion (e.g., the data portion 450). A receiving device is able to determine whether the subfield 614 should be interpreted as containing a length indication or a duration indication based on the value of the aggregation subfield 612 of the signal field 600, in an embodiment. For example, the aggregation subfield 612 is a one bit subfield, and a transmitting device sets the aggregation bit to a value of 0 to indicate that the length/duration subfield 614 includes a length indication, and sets the aggregation bit to a value of 1 to indicate that the length/duration subfield 614 includes a duration indication, or vice versa. Due to low data rate generally used for transmission of low bandwidth data units, duration of the data portion of the data unit is generally relatively large (e.g., the data portion includes a relatively large number of OFDM tones), and including a duration indication in the length duration subfield 614 is sometimes impractical. Thus, in some embodiments, the length/duration subfield 614 is limited to including a length indication.

The coding subfield 606 indicates whether a data portion of the data unit that includes the signal field 600 is encoded using a BCC encoder or an LDPC encoder. For example, the coding subfield 606 is a one bit subfield, and a transmitting device sets the coding bit to a value of 0 to indicate that the data portion is BCC encoded, and sets the coding bit to a value of 1 to indicate that the data portion is LDPC encoded, or vice versa. In another embodiment, the coding subfield 606 includes an additional bit to indicate whether an additional OFDM symbol is used to LDPC encode the data portion, as will be explained in more detail below.

In some embodiments, a set of information bits to be included in a normal mode or a low bandwidth mode data unit is padded with one or more padding bits. Padding is utilized, for example, to ensure that a set of encoded (and, if needed, padded) information bits entirely fills out an integer number of OFDM symbols, for example. Referring to FIG. 1, padding is performed at least partially by the MAC processing unit 18 or the MAC processing unit 28, in an embodiment. In an embodiment, padding is performed at least partially by the PHY processing unit 20 or the PHY processing unit 29. In some embodiments, a different padding scheme is used for a data unit depending on whether the length of the data unit is indicated as a length or a duration of a data portion of the data unit. For example, referring to FIG. 3, when the signal field 306 includes an indication of the number of bytes in the data portion 350 (length indication), information bits to be included in the data portion 350 are padded according to a padding scheme that is different form a padding scheme used to pad information bits to be included in the data portion 350 when the signal field 306 includes an indication of the number of OFDM symbols (duration indication) in the data portion 350. Similarly, a different padding scheme is utilized to pad information bits to be included in the data portion 450 of the low bandwidth data unit 400 of FIG. 4 depending on whether the signal field 406 includes an indication of the number of bytes in the data portion 450 or the number of OFDM symbols in the data portion 450, as indicated by an aggregation subfield of the signal field 406, for example. In an embodiment, the same padding scheme is utilized for a data unit that includes a length indication regardless of whether the data unit is a normal mode data unit or a low bandwidth data unit. Similarly, the same padding scheme is utilized for a data unit that includes a duration indication regardless of whether the data unit is a normal mode data unit or a low bandwidth data unit, in an embodiment.

Figure 7:
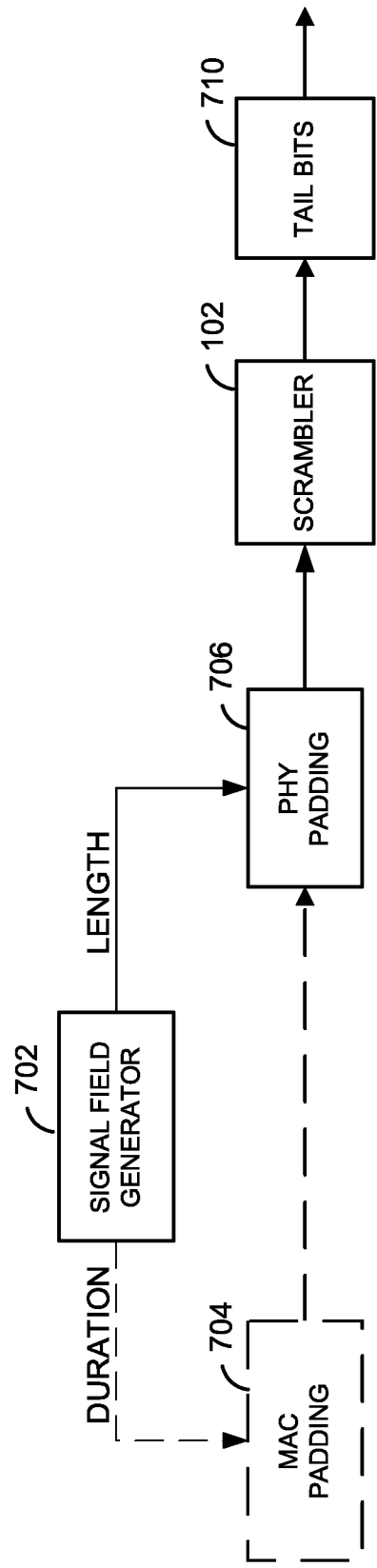
FIG. 7 is a block diagram of an example padding system, according to an embodiment.

FIG. 7 is a block diagram of an example padding system 700, according to an embodiment. The padding system 700 is used in conjunction with the PHY processing unit 200 of FIG. 2, in an embodiment. In an embodiment, the PHY processing unit 29 includes at least some components of the padding system 700. Similarly, in an embodiment, the MAC processing unit 28 includes at least some components of the padding system 700. In an embodiment, the PHY processing units 20 and/or the MAC processing unit 18 each includes at least some components of the padding system 700. The padding system 700 is used to add padding and/or tail bits to information bits to be included in the data portion 350 of FIG. 3, in an embodiment. In another embodiment, the padding system 700 is used to add padding and/or tail bits to information bits to be included in the data portion 450 of FIG. 4.

In operation, a signal field generator 702 generates a signal field to be included in a data unit. For example, the signal field generator 702 generates the signal field 500 of FIG. 5 to be included in a normal mode data unit, such as the data unit 300 of FIG. 3, in one embodiment and/or scenario. In another embodiment and/or scenario, the signal field generator 702 generates the signal field 600 of FIG. 6 to be included in a low bandwidth mode data unit, such as the data unit 400 of FIG. 4. In other embodiments, the signal field generator 702 generates other suitable signal fields and/or generates signal field s to be included in other suitable normal mode and/or low bandwidth mode data unit.

In an embodiment, the signal field generated for a data unit by the signal field generator 702 includes a length/duration indication subfield to indicate a length or a duration of a data portion of the data unit. The signal field also includes an indication of whether the length/duration subfield includes a length indication or a duration indication. In an embodiment, when the signal field generated for a data unit by the single field generator 702 includes a length indication, the padding system 700 implements a first padding scheme in generating the data unit. On the other hand, when the signal field includes a duration indication, the padding system 700 implements a second padding scheme, different than the first padding scheme, when generating the data unit, according to an embodiment.

In some embodiments, the particular first and/or second padding scheme utilized by the padding system 700 depends on the type of coding used to encode the data portion of the data unit. For example, the particular first and/or second padding scheme to be used for a data unit is determined also based on whether the data portion of the data unit is to be encoded using BCC coding or using LDPC coding, in some embodiments.

In general, the padding system 700 determines an integer number of OFDM symbols needed to includes a set of information bits to be included in a data unit, and determines a number of padding bits to be added to the information bits such that the padded information bits entirely fill the determined integer number of OFDM symbols. For BCC encoding, a number of OFDM symbols needed to include a set of information bits after being encoded is determined according to Equation 3, and a number of padding bits needed so that the encoded bits entire fill the determined number of OFDM symbols is determined according to Equation 4:

$$N_{SYM} = m_{STBSC} \left\lceil \frac{8*L + N_{service} + 6*N_{ES}}{m_{STBS}*N_{DBPS}} \right\rceil \quad \text{Equation 3}$$

$$N_{PAD} = N_{SYM}*N_{DBPS} - 8*L - N_{service} - 6*N_{ES} \quad \text{Equation 4}$$

where L is the number of information bits expressed in octets, $m_{STBSC}$ is equal to 1 if STBC is not utilized and is equal to 2 if STBC is utilized, $N_{service}$ is a number of service bits included in a data unit (e.g., service bits in a data portion of the data unit), $N_{ES}$ is the number of operating encoders, $N_{DBPS}$ is the number of data bits per OFDM symbol, and $\lceil \ \rceil$ denotes the integer ceiling function.

The determined number of padding bits are then added to the information bits by a MAC padding unit 7074 and/or a PHY padding unit 706, depending on the particular padding scheme being employed by the padding system 700. For example, when the signal field generator 702 is to include a duration indication rather than a length indication in the signal field generated for the data unit, insertion of the determined number of padding bits is split between the MAC padding unit 704 and the PHY padding unit 706. In a particular embodiment, the MAC padding unit 70 pads the information bits until a last integer byte is reached. Then, the PHY padding unit 706 adds additional padding bits, if necessary, to reach the total number of padding bits determined according to Equation 4. On the other hand, when the signal field generated by the signal field generator 702 is generated to include a length indication rather than a duration indication, then MAC padding is not performed, and the number of padding bits determined according to Equation 4 is added to information bits entirely by the PHY padding unit 706. In either case, as illustrated in FIG. 7, the padded information bits are then scrambled by the scrambler 102, and a number of tail bits (e.g. 6Nes tail bits) are added to the padded and scrambled information bits by the tail bit insertion unit 710.

In an embodiment, the signal/duration subfield of the signal field generated for the data unit by the signal field generator 706 is set to indicate the number of symbols determined according to Equation 3 when duration indication is utilized, and is set to the length L when length indication is being utilized.

On the other hand, when the data portion of the data unit being generated is to be LDPC encoded, an initial number of OFDM symbols needed to include a set of information bits after being encoded is determined according to Equation 5, a number of data bits that entirely fills out the initial number of symbols is determined according to Equation 6, and a number of available (or coded) bits in the initial number of OFDM symbols is determined according to Equation 7:

$$N_{SYM,init} = m_{STBSC} \left\lceil \frac{8*L + N_{service}}{m_{STBS}*N_{DBPS}} \right\rceil \quad \text{Equation 5}$$

$$N_{pld} = N_{SYM,init} N_{DBPS} \quad \text{Equation 6}$$

$$N_{avbits} = N_{SYM,init} N_{CBPS} \quad \text{Equation 7}$$

where $N_{CBPS}$ is a number of coded bits per symbol.

A number of padding bits needed to be added to the information bits so that encoded information stream completely fills the initial number of OFDM symbols is then determined according to Equation 8:

$$N_{PAD} = N_{SYM,init}*N_{DBPS} - 8*L - N_{service} \quad \text{Equation 8}$$

Similar to the case of BCC encoding, with LDPC encoding, the padding scheme used for adding the necessary number of padding bits depends on whether the signal field generated for the data unit includes a length indication or a duration indication to indicate the length or duration, respectively, of the data unit being generated, in some embodiments. In an embodiment, when the signal field includes a duration indication, insertion of the determined number of padding bits is split between MAC layer processing and PHY layer processing of the information bits. For example, in an embodiment, the MAC padding unit 704 adds a first number of padding bits such that information bits are padded until a last integer byte in $N_{sym}$ OFDM symbols is reached. Then, the PHY padding unit 706 adds additional padding bits (e.g., additional 0 to 7 padding bits), if necessary, to reach the total number of padding bits determined according to Equation 4. On the other hand, when the signal field generator 702 generates the signal field to include a length indication, then MAC padding is not performed, and the total number of required padding bits are added to the information during PHY layer processing of the information bits, e.g. by the PHY padding unit 706, in an embodiment. In either case, the padded information bits are then scrambled information bits by the scrambler 102.

After the padded information bits are scrambled by the scrambler 102, the padded scrambled information bits are then encoded by an LDPC encoder (e.g., an encoder 106 of FIG. 1). LDPC encoding includes, for example, one or more of shortening, puncturing and/or repetition of bits. After LDPC encoding, an updated number of available coded bits $N'_{avbits}$ is derived, and an updated number of OFDM symbols needed to transmit the updated number of available coded bits is determined according to:

$$N_{SYM} = N'_{avbits}/N_{CBPS} \quad \text{Equation 9}$$

In an embodiment, the signal/duration subfield of the signal field generated for the data unit by the signal field generator 706 is set to indicate the number of symbols determined according to Equation 9 when duration indication is utilized, and is set to the length L when length indication is being utilized.

Figure 8:
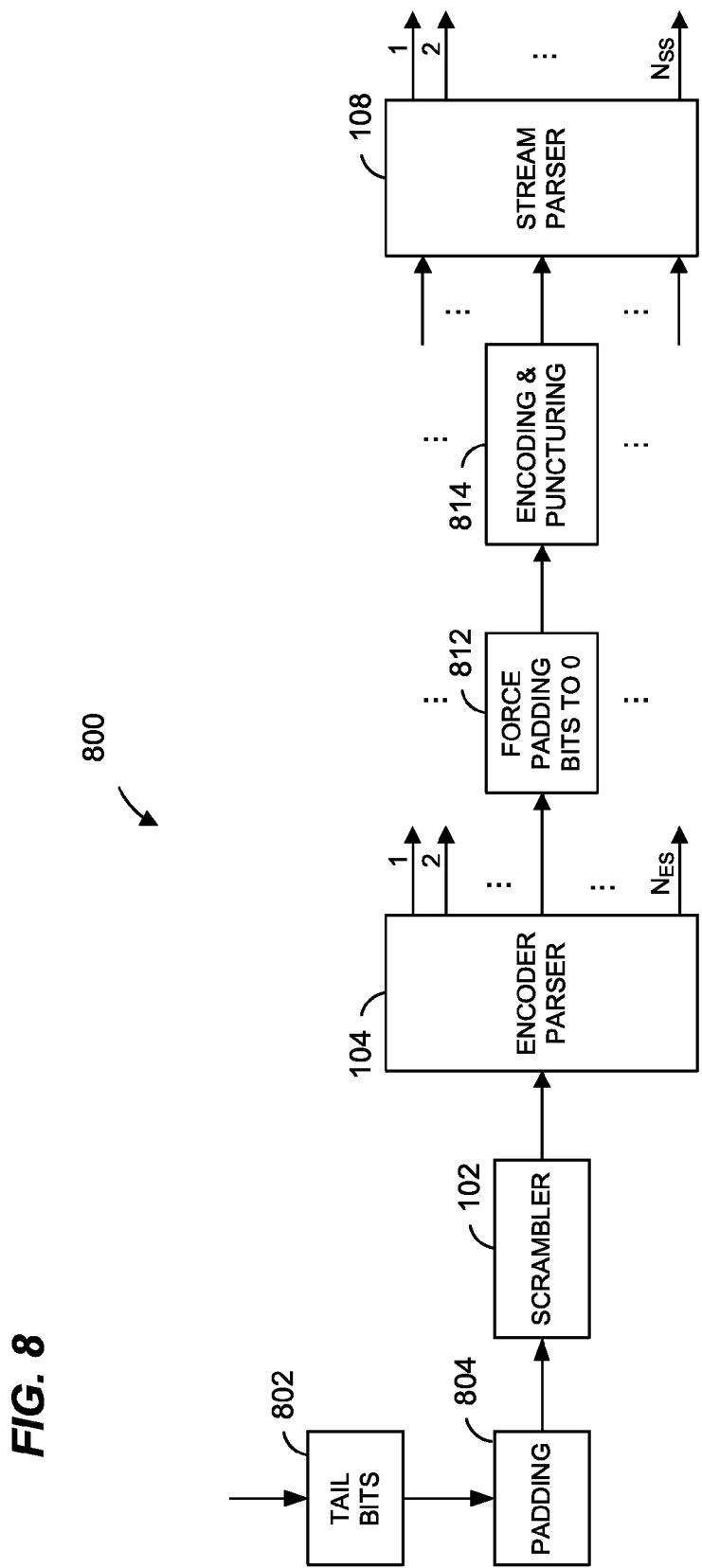
FIG. 8 is a block diagram of another example padding system, according to an embodiment.

FIG. 8 is a diagram of a padding system 800, according to an embodiment. The padding system 800 is utilized in generating a data unit when a signal field of the data unit includes a length indication to indicate a length of a data portion of the data unit. The padding system 800 is used in conjunction with the PHY processing unit 200 of FIG. 2, in an embodiment. In an embodiment, the PHY processing unit 29 includes at least some components of the padding system 800. Similarly, in an embodiment, the MAC processing unit 28 includes at least some components of the padding system 800. In an embodiment, the PHY processing units 20 and/or the MAC processing unit 18 each includes at least some components of the padding system 900. The padding system 800 is used to add padding and/or tail bits to information bits to be included in the data portion 350 of FIG. 3, in an embodiment. In another embodiment, the padding system 700 is used to add padding and/or tail bits to information bits to be included in the data portion 450 of FIG. 4.

In some embodiments, the padding system 800 is utilized for data units that are to be encoded using BCC encoding, and is not utilized for data units that are to be LDPC encoded. In some such embodiments, no padding is required for data units that are to be LDPC encoded when the signal field of the data unit includes a length indication to indicate a length of the data portion of the data unit. The padding system 800 includes a tail bits insertion unit 802 that inserts a number of tail bits into a set of information bits to be included in the data unit. The padding system 800 also includes a padding unit 804 that adds a determined number of padding bits to the information and tail bits. The necessary number of padding bits to be added to the set of information bits is determined according to Equation 4, for example, in one embodiment. The information bits, tail bits and padding bits are then scrambled by the scrambler 102, and the scrambled bits are then parsed to one or more encoders by the encoder parser 104. Then, prior to encoding an puncturing by the encoding/puncturing units 801, padding bits are forced to logic 0 by a respective padding unit 812 for each encoding/puncturing unit 812. The encoded bits are parsed to one or more spatial streams by the spatial stream parser 108. As can be seen in FIG. 8, tail bits are added to information bits first, and padding bits are inserted after the tail bits in the padding system 800, in the illustrated embodiment.

Figure 9:
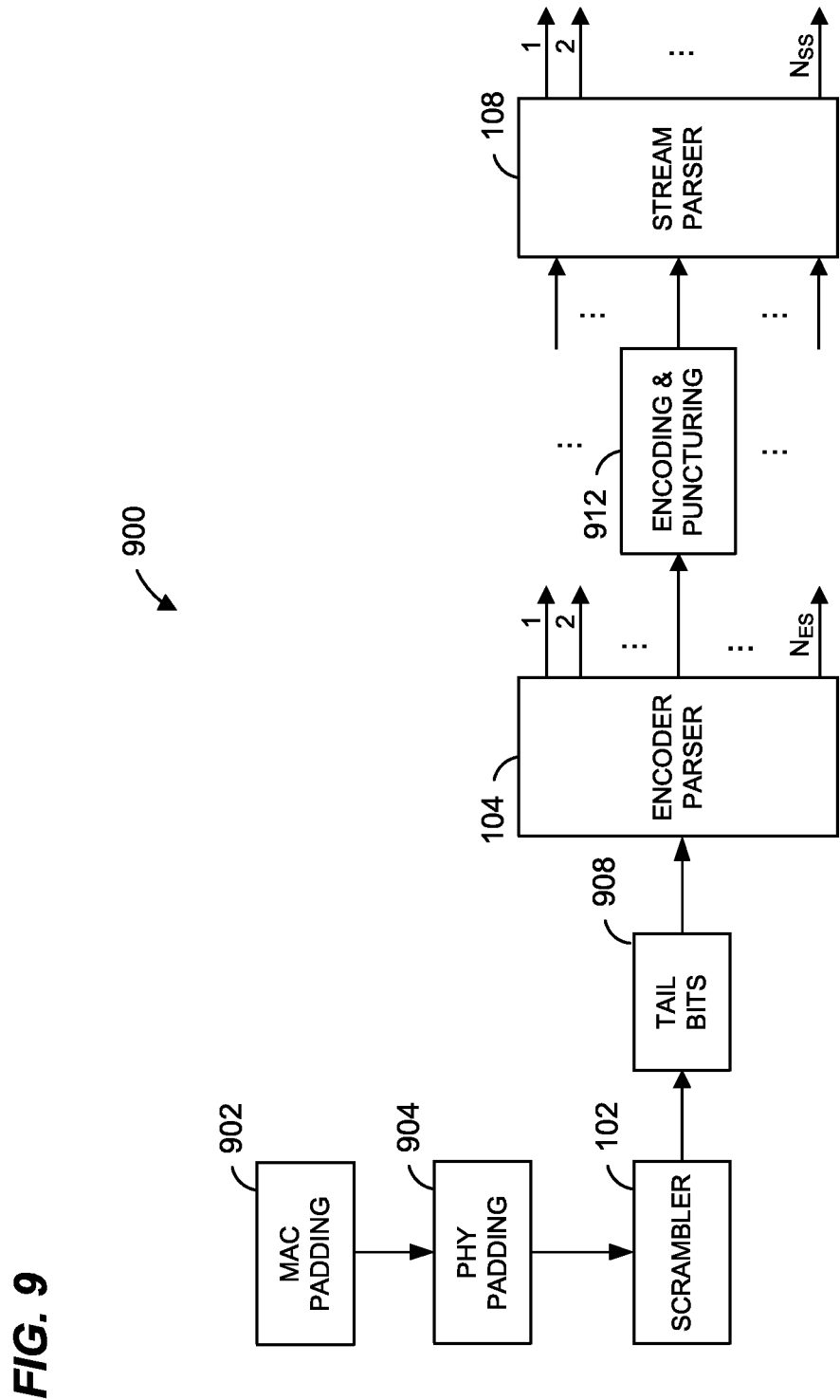
FIG. 9 is a block diagram of yet another example padding system, according to an embodiment.

FIG. 9 is a diagram of a padding system 900, according to an embodiment. The padding system 900 is utilized in generating a data unit when a signal field of the data unit includes a duration indication to indicate a duration of a data portion of the data unit. The padding system 900 is used in conjunction with the PHY processing unit 200 of FIG. 2, in an embodiment. In an embodiment, the PHY processing unit 29 includes at least some components of the padding system 900. Similarly, in an embodiment, the MAC processing unit 28 includes at least some components of the padding system 900. In an embodiment, the PHY processing units 20 and/or the MAC processing unit 18 each includes at least some components of the padding system 900. The padding system 900 is used to add padding and/or tail bits to information bits to be included in the data portion 350 of FIG. 3, in an embodiment. In another embodiment, the padding system 700 is used to add padding and/or tail bits to information bits to be included in the data portion 450 of FIG. 4.

In an embodiment, a number of padding bits to be added to a set of information bits is determined according to Equation 3 when BCC encoding is utilized to encode the data portion of the data unit. When LDPC encoding is utilized, the number of padding bits to be added to the information bits by the padding system 900 is determined according to Equation 8, in an embodiment. In either case, in the padding system 900, insertion of the determined number of padding bits is split between MAC and PHY processing of information bits. A MAC padding unit 902 adds a first number of padding bits to the set of information bits until the integer number of bytes is reached, and a PHY padding unit 904 adds to the information bits a second number of padding bits that includes the remaining 0 to 7 padding bits. The padded information bits are then scrambled by the scrambler 102. A tail bit insertion unit 908 then adds tail bits to the scrambled information and padding bits. The information, padding, and tail bits are then parsed to one or more encoding and puncturing units 912 that encode the bit stream and provide the encoded bit stream to the spatial stream parser 108, which parses the encoded bits for transmission over one or more spatial streams. Compared to the padding system 800 of FIG. 8, in the padding system 900 of FIG. 1, all necessary padding bits are added to information bits prior to insertion of tail bits, in this embodiment. Because tail bits are added after padding bits, padding bits need not necessarily be set to a logic value of 0, but can be set to any arbitrary logic values (e.g., zero padding bits, non-zero padding bits, a combination of zero padding bits and non-zero padding bits, etc.), in this case. In an embodiment, when the padding system 900 is used in conjunction with and LDPC encoder (or LDPC encoders), tail bits are not inserted (e.g., the tail bit insertion unit 908 is omitted or bypassed).

In some embodiments, to increase robustness of LDPC encoded transmissions, OFDM tones are remapped or reordered when an LDPC encoded data unit is generated. Remapping or reordering of OFDM tones allows for data bits encoded using a single codeword that does not cover an entire bandwidth to be spread over the entire bandwidth, in an embodiment. Tone reordering utilized in some embodiments is described in more detail in U.S. patent application Ser. No. 13/250,661, filed on Sep. 30, 2011 and entitled "Tone Reordering in a Wireless Communication System," which is hereby incorporated by reference herein in its entirety. In some embodiments, tone reordering is performed for normal mode data units and is not performed when low bandwidth data units are generated. In some embodiments, tone reordering is performed only in a case of LDPC encoding for normal bandwidth data units, and is not performed for low bandwidth data units due to a relatively flat frequency response associated with low bandwidth (e.g., 1 MHz) communication channels. In another embodiment, however, tone reordering is utilized in the case of LDPC encoding for both normal and low bandwidth mode data units.

Figure 10:
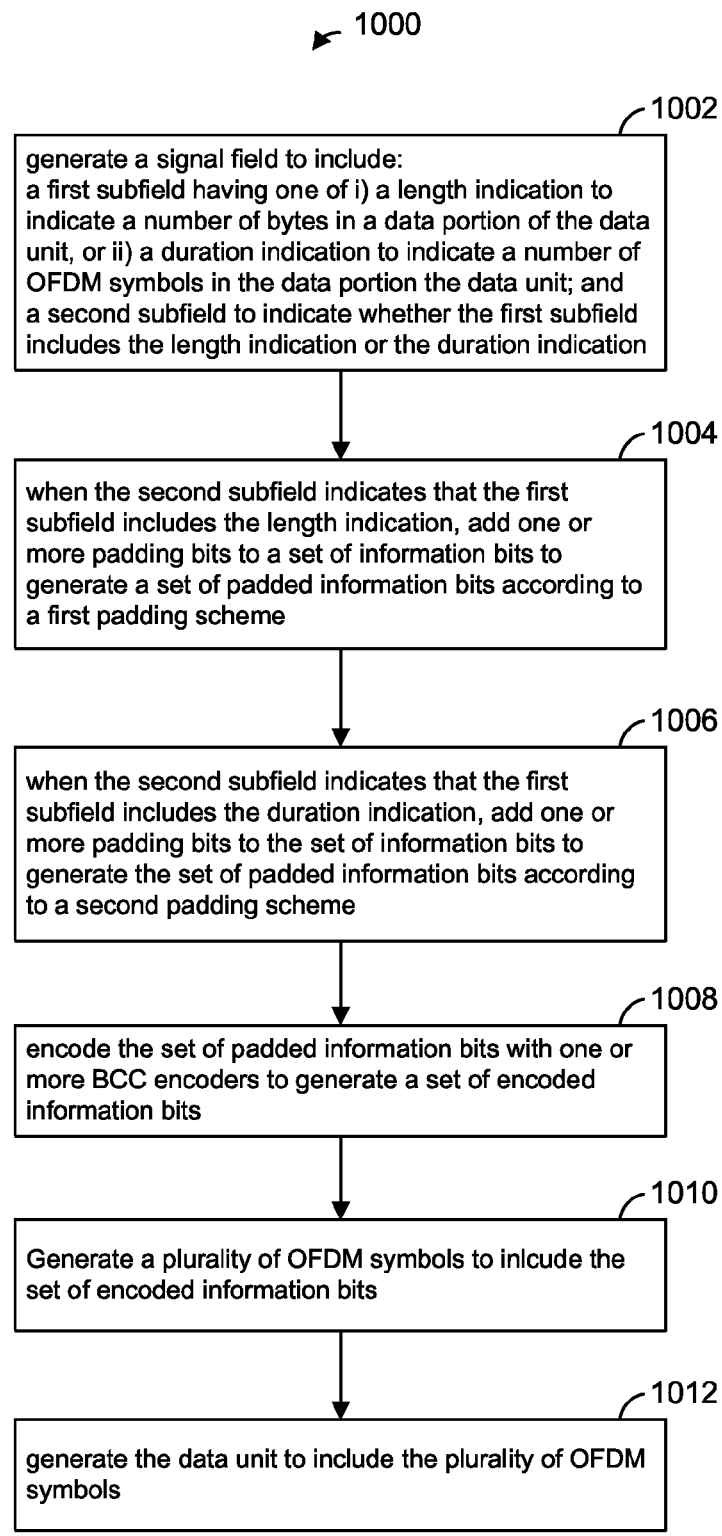
FIG. 10 is a flow diagram of an example method for generating a data unit, according to an embodiment.

FIG. 10 is a flow diagram of an example method 1000 for generating data units, according to an embodiment. With reference to FIG. 1, the method 1000 is implemented by the network interface 16, in some embodiments. For example, in one such embodiment, the PHY processing unit 20 is configured to implement the method 1000. According to another embodiment, the MAC processing 18 is also configured to implement at least a part of the method 1000. With continued reference to FIG. 1, in yet another embodiment, the method 1000 is implemented by the network interface 27 (e.g., the PHY processing unit 29 and/or the MAC processing unit 28). In other embodiments, the method 1000 is implemented by other suitable network interfaces.

At block 1001, a signal field is generated. For example, in one embodiment and/or scenario, the normal mode signal field 500 of FIG. 5 is generated. As another example, in another embodiment and/or scenario, the low bandwidth mode signal field 600 of FIG. 6 is generated. In other embodiments, other suitable signal fields are generated. The signal field generated at block 1002 includes a first subfield having either a length indication to indicate a number of bytes in a data portion of the data unit, or a duration indication to indicate a number of OFDM symbols in the data portion of the data unit. For example, the signal field includes the length/duration subfield 524 to indicate a length or a duration of the data unit, and the aggregation subfield 522 to indicate whether the length/duration subfield 524 includes the length indication or the duration indication, in one embodiment and/or scenario. Similarly, as another example, the signal field includes the length/duration subfield 614 to indicate a length or a duration of the data unit, and the aggregation subfield 612 to indicate whether the length/duration subfield 614 includes the length indication or the duration indication.

At block 1002, when the second subfield indicates that the first subfield includes the length indication, one or more padding bits are added to a set of information bits to be included in the data unit. Padding at block 1002 is performed according to a first padding scheme. For example, in an embodiment, a number of padding bits that need to be added to the information bits is determined according to Equation 4, and the determined number of padding bits is added to the set of information bits during PHY processing of the information bits, in an embodiment. On the other hand, when the second subfield indicates that the first subfield includes the duration indication, the padding is performed, at block 1004, according to a second padding scheme. In an embodiment, similar to the first padding scheme, a total number of padding bits that need to be added to the information bits is determined according to Equation 4. However, insertion of the determined number of padding bits is split between MAC layer processing and PHY layer processing of the information bits, in an embodiment. For example, a first number of padding bits are added to the information bits during MAC layer processing of the information bits (e.g., by the MAC padding unit 704 of FIG. 7) and a second number of padding bits are added to the information bits during PHY layer processing of the information bits (e.g., by the PHY padding unit 706 of FIG. 7). The first number of padding bits is determined such that a set of MAC padded information bits entirely fills a greatest integer number of bytes in the determined number of OFDM symbols, and the second number of padding bits is determined such that a mathematical sum of the first number of padding bits and the second number of padding bits equals the determined total number of padding bits, in an embodiment.

At block 1008, the set of padded information bits generated at block 1004 or at block 1008 is encoded using one or more BCC encoders to generate a set of encoded information bits. For example, the set of padded information bits is encoded using one or more encoders FEC encoders 106 of FIG. 1, where the FEC encoders 106 include BCC encoders. At block 1010, a plurality of OFDM symbols is generated to include the set of encoded information bits. At block 1012, the data unit is generated to include the plurality of OFDM symbols. For example, the data unit 300 of FIG. 3 is generated, in one embodiment. As another example, the data init 400 of FIG. 4 is generated, in another embodiment. In other embodiments, other suitable data units are generated.

Figure 11:
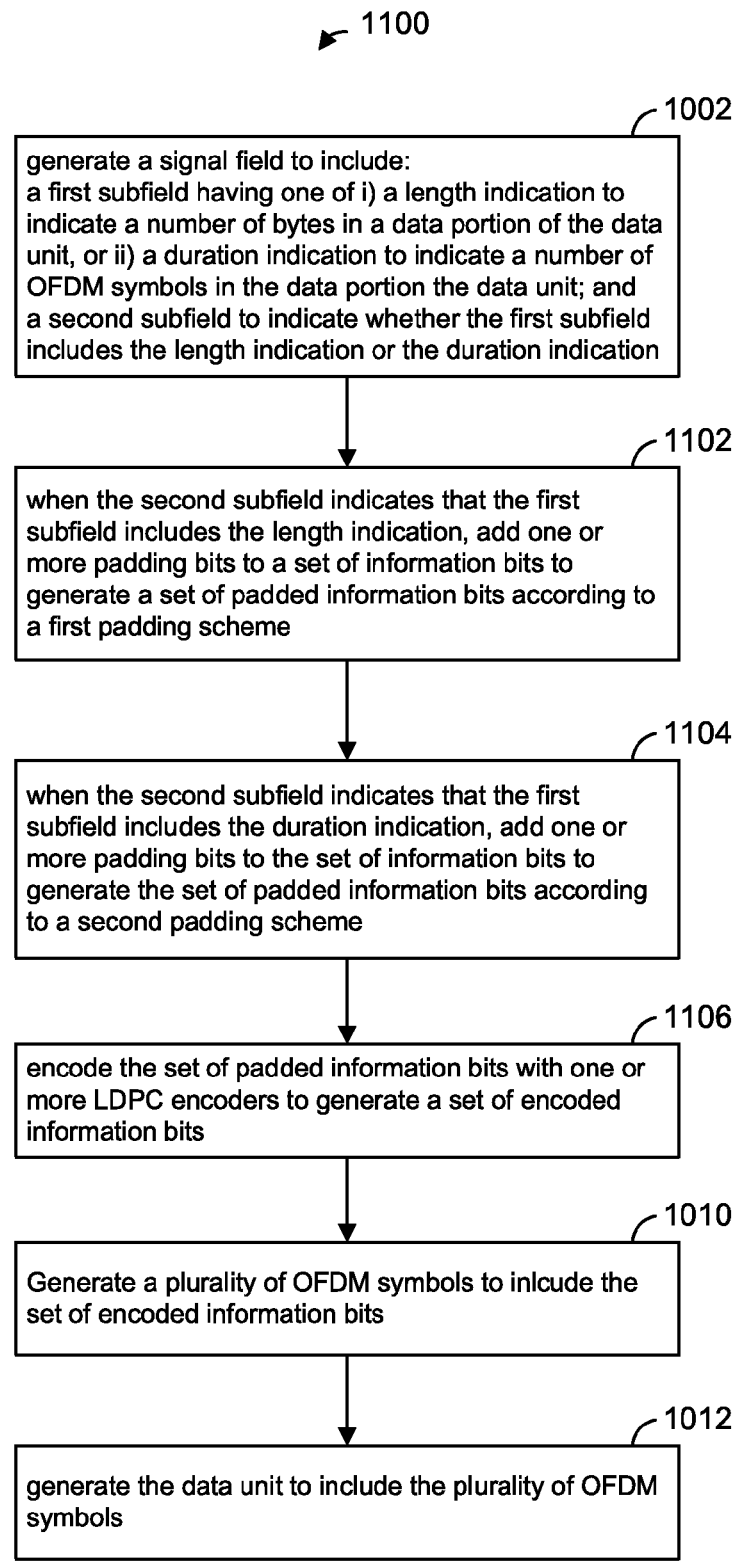
FIG. 11 is a flow diagram of an example method for generating data units, according to an embodiment.

FIG. 11 is a flow diagram of an example method 1100 for generating data units, according to an embodiment. With reference to FIG. 1, the method 1100 is implemented by the network interface 16, in some embodiments. For example, in one such embodiment, the PHY processing unit 20 is configured to implement the method 1100. According to another embodiment, the MAC processing 18 is also configured to implement at least a part of the method 1100. With continued reference to FIG. 1, in yet another embodiment, the method 1100 is implemented by the network interface 27 (e.g., the PHY processing unit 29 and/or the MAC processing unit 28). In other embodiments, the method 1100 is implemented by other suitable network interfaces.

The method 1100 is generally similar to the method 1000 of FIG. 10 and includes several like-numbered blocks that, for the purpose of conciseness, are not discussed. Unlike the method 1000, which is generally implemented in embodiments and/or scenarios in which BCC coding is used to encode information bits, method 1100 is generally implemented in embodiments and/or scenarios in which LDPC coding is used.

At block 1002, when the second subfield indicates that the first subfield includes the length indication, one or more padding bits are added to a set of information bits to be included in the data unit. Padding at block 1002 is performed according to a first padding scheme. For example, in an embodiment, a number of padding bits that need to be added to the information bits is determined according to Equation 8, and the determined number of padding bits is added to the set of information bits during PHY processing of the information bits, in an embodiment. On the other hand, when the second subfield indicates that the first subfield includes the duration indication, the padding is performed, at block 1004, according to a second padding scheme. In an embodiment, similar to the first padding scheme, a total number of padding bits that need to be added to the information bits is determined according to Equation 8. However, insertion of the determined number of padding bits is split between MAC layer processing and PHY layer processing of the information bits, in an embodiment. For example, a first number of padding bits are added to the information bits during MAC layer processing of the information bits (e.g., by the MAC padding unit 704 of FIG. 7) and a second number of padding bits are added to the information bits during PHY layer processing of the information bits (e.g., by the PHY padding unit 706 of FIG. 7). The first number of padding bits is determined such that a set of MAC padded information bits entirely fills a greatest integer number of bytes in the determined number of OFDM symbols, and the second number of padding bits is determined such that a mathematical sum of the first number of padding bits and the second number of padding bits equals the determined total number of padding bits, in an embodiment.

At block 1106, the set of padded information bits generated at block 1004 or at block 1008 is encoded using one or more LDPC encoders to generate a set of encoded information bits. For example, the set of padded information bits is encoded using one or more encoders FEC encoders 106 of FIG. 1, where the FEC encoders 106 include LDPC encoders.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

In an embodiment, a method for generating an orthogonal frequency division multiplexing (OFDM) physical layer (PHY) data unit for transmission via a communication channel includes generating a signal field to include a first subfield having one of i) a length indication to indicate a number of bytes in a data portion of the data unit, or ii) a duration indication to indicate a number of OFDM symbols in the data portion of the data unit and a second subfield to indicate whether the first subfield includes the length indication or the duration indication. The method also includes when the second subfield indicates that the first subfield includes the length indication, adding one or more padding bits to a set of information bits to generate a set of padded information bits according to a first padding scheme, and when the second subfield indicates that the first subfield includes the duration indication, adding one or more padding bits to the set of information bits to generate the set of padded information bits according to a second padding scheme, the second padding scheme different than the first padding scheme. The method further includes encoding the set of padded information bits with one or more binary convolutional coding (BCC) encoders to generate a set of encoded information bits. The method additionally includes generating a plurality of OFDM symbols to include the set of encoded information bits and generating the data unit to include the plurality of OFDM symbols.

In other embodiments, the method includes any combination of one or more of the following elements.

Generating the set of padded information bits according to the first padding scheme includes determining, based on the number of bytes in the data portion, an integer number of OFDM symbols needed to fit the set of information bits after being encoded with one or more BCC encoders, determining a number of padding bits needed to be added to the information bits so the set of padded information bits entirely fills the integer number of OFDM symbols, and adding the number of padding bits during PHY layer processing of the information bits.

Generating the set of padded information bits according to the second padding scheme includes determining an integer number of OFDM symbols needed to fit the set of information bits after being encoded with one or more BCC encoders, determining a total number of padding bits needed to be added to the information bits so the set of padded information bits entirely fills the integer number of OFDM symbols, adding a first number of padding bits during MAC layer processing of the information bits to generate a set of MAC padded information bits, wherein the first number of padding bits is determined such that such set MAC padded information bits entirely fill a greatest integer number of bytes in the determined number OFDM symbols, and adding a second number of padding bits during PHY layer processing of the information bits; wherein the second number of padding bits is determined such that a sum of the first number of padding bits and the second number of padding bits equals the total number of padding bits, wherein generating the signal field includes setting the first subfield to the determined integer number of OFDM symbols.

The method further includes adding tail bits to the set of padded information bits after adding padding bits and before encoding information bits with the one or more BCC encoders.

Adding one or more padding bits to the set of information bits to generate the set of padded information bits according to the first padding scheme includes adding at least some non-zero padding bits.

In another embodiment, an apparatus for generating a PHY data unit for transmission via a communication channel comprises a network interface. The network is configured to generate a signal field to include a first subfield to having one of i) a length indication to indicate a number of bytes in a data portion of the data unit, or ii) a duration indication to indicate a number of OFDM symbols in the data portion of the data unit and a second subfield to indicate whether the first subfield includes the length indication or the duration indication. The network interface is also configured to when the second subfield indicates that the first subfield includes the length indication, add one or more padding bits to a set of information bits to generate a set of padded information bits according to a first padding scheme, and when the second subfield indicates that the first subfield includes the duration indication, add one or more padding bits to the set of information bits to generate the set of padded information bits according to a second padding scheme, the second padding scheme different than the first padding scheme. The network interface is further configured to encode the set of padded information bits with one or more binary convolutional coding (BCC) encoders to generate a set of encoded information bits. The network interface is additionally configured to generate a plurality of OFDM symbols to include the set of encoded information bits and generate the data unit to include the plurality of OFDM symbols.

In other embodiments, the apparatus includes any combination of one or more of the following elements.

The network interface is configured to generate the set of padded information bits according to the first padding scheme at least by determining, based on the number of bytes in the data portion, an integer number of OFDM symbols needed to fit the set of information bits after being encoded with one or more BCC encoders, determining a number of padding bits needed to be added to the information bits so the set of padded information bits entirely fills the integer number of OFDM symbols, and adding the number of padding bits during PHY layer processing of the information bits.

The network interface is configured to generate the set of padded information bits according to the second padding scheme at least by determining an integer number of OFDM symbols needed to fit the set of information bits after being encoded with one or more BCC encoders, determining a total number of padding bits needed to be added to the information bits so the set of padded information bits entirely fills the integer number of OFDM symbols, adding a first number of padding bits during MAC layer processing of the information bits to generate a set of MAC padded information bits, wherein the first number of padding bits is determined such that such set MAC padded information bits entirely fill a greatest integer number of bytes in the determined number OFDM symbols, and adding a second number of padding bits during PHY layer processing of the information bits; wherein the second number of padding bits is determined such that a sum of the first number of padding bits and the second number of padding bits equals the total number of padding bits, wherein the network interface is configured to set the first subfield to indicate the determined integer number of OFDM symbols.

The network interface is further configured to add tail bits to the set of padded information bits after adding padding bits and before encoding information bits with the BCC encoder.

The network interface is configured to, when adding one or more padding bits to the set of information bits to generate the set of padded information bits according to the first padding scheme, add at least some non-zero padding bits.

In yet another embodiment, a method for generating an orthogonal frequency division multiplexing (OFDM) physical layer (PHY) data unit for transmission via a communication channel includes generating a signal field to include a first subfield having one of i) a length indication to indicate a number of bytes in a data portion of the data unit, or ii) a duration indication to indicate a number of OFDM symbols in the data portion of the data unit and a second subfield to indicate whether the first subfield includes the length indication or the duration indication. The method also includes when the second subfield indicates that the first subfield includes the length indication, adding one or more padding bits to a set of information bits to generate a set of padded information bits according to a first padding scheme, and when the second subfield indicates that the first subfield includes the duration indication, adding one or more padding bits to the set of information bits to generate the set of padded information bits according to a second padding scheme, the second padding scheme different than the first padding scheme. The method further includes encoding the set of padded information bits with one or more low density parity check (LDPC) encoders to generate a set of encoded information bits. The method additionally includes generating a plurality of OFDM symbols to include the set of encoded information bits and generating the data unit to include the plurality of OFDM symbols.

In other embodiments, the method includes any combination of one or more of the following elements.

Generating the padded information bits according to the first padding scheme includes determining, based on the number of bytes in the data portion, an initial integer number of OFDM symbols needed to fit the set of information bits after being encoded with one or more LDPC encoders, determining a number of padding bits needed to be added to the set of information bits so the padded information bits entirely fill the initial integer number of OFDM symbols, adding the number of padding bits during PHY layer processing of the information bits, and determining an updated number of OFDM symbols after encoding the padded information bits, wherein generating the signal field includes setting the first subfield to indicate the updated number of OFDM symbols.

Generating the signal field further comprises including a third subfield to indicate whether the updated number of OFDM symbols is greater than the initial number of OFDM symbols.

Generating the padded information bits according to the second padding scheme includes determining an initial integer number of OFDM symbols needed to fit the set of information bits after being encoded with one or more LDPC encoders, determining a total number of padding bits needed to be added to the information bits so the set of padded information bits entirely fills the initial integer number of OFDM symbols, adding a first number of padding bits during MAC layer processing of the information bits to generate a set of MAC padded information bits, wherein the first number of padding bits is determined such that such that set MAC padded information bits entirely fill a greatest integer number of bytes in the determined number OFDM symbols, adding a second number of padding bits during PHY layer processing of the information bits; wherein the second number of padding bits is determined such that a sum of the first number of padding bits and the second number of padding bits equals the total number of padding bits, and determining an updated number of OFDM symbols needed to fit encoded padded information bits, wherein generating the signal field includes setting the first subfield to indicate the updated number of OFDM symbols.

Generating the signal field further comprises including a third subfield to indicate whether the updated number of OFDM symbols is greater than the initial number of OFDM symbols.

The method further comprises performing tone reordering when the data unit is to be transmitted in a normal mode of operation and omitting tone reordering when the data unit is to be transmitted in a low bandwidth mode of operation.

In still another embodiment, an apparatus for generating a PHY data unit for transmission via a communication channel comprises a network interface. The network interface is configured to generate a signal field to include a first subfield to include one of i) a length indication to indicate a number of bytes in a data portion of the data unit and ii) a duration indication to indicate a number of OFDM symbols in the data portion of the data unit and a second subfield to indicate whether the first subfield includes the length indication or the duration indication. The network interface is also configured to when the second subfield indicates that the first subfield includes the length indication, add one or more padding bits to a set of information bits to generate a set of padded information bits according to a first padding scheme and when the second subfield indicates that the first subfield includes the duration indication, add one or more padding bits to the set of information bits to generate the set of padded information bits according to a second padding scheme, the second padding scheme different than the first padding scheme. The network interface is further configured to encode the set of padded information bits with one or more low density parity check (LDPC) encoders to generate a set of encoded information bits. The network interface is additionally configured to generate a plurality of OFDM symbols to include the set of encoded information bits and generate the data unit to include the plurality of OFDM symbols.

In other embodiments, the apparatus includes any combination of one or more of the following elements.

The network interface is configured to generate the set of padded information according to the first padding scheme at least by determining, based on the number of bytes in the data portion, an initial integer number of OFDM symbols needed to fit the set of information bits after being encoded with one or more LDPC encoders, determining a number of padding bits needed to be added to the set of information bits so the padded information bits entirely fill the initial integer number of OFDM symbols, adding the number of padding bits during PHY layer processing of the information bits, and determining an updated number of OFDM symbols after encoding the padded information bits, wherein the network interface is configured to set the first subfield to indicate the updated number of OFDM symbols.

The network interface is configured to generate the signal field to further include a third subfield to indicate whether the updated number of OFDM symbols is greater than the initial number of OFDM symbols.

The network interface is configured to generate the set of padded information bits according to the second padding scheme at least by determining an initial integer number of OFDM symbols needed to fit the set of information bits after being encoded with one or more LDPC encoders, determining a total number of padding bits needed to be added to the information bits so the set of padded information bits entirely fills the initial integer number of OFDM symbols, adding a first number of padding bits during MAC layer processing of the information bits to generate a set of MAC padded information bits, wherein the first number of padding bits is determined such that such that set MAC padded information bits entirely fill a greatest integer number of bytes in the determined number OFDM symbols, adding a second number of padding bits during PHY layer processing of the information bits; wherein the second number of padding bits is determined such that a sum of the first number of padding bits and the second number of padding bits equals the total number of padding bits, and determining an updated number of OFDM symbols needed to fit encoded padded information bits, wherein the network interface is configured to set the first subfield in to indicate the updated number of OFDM symbols.

The network interface is configured to generate the signal field to further include a third subfield to indicate whether the updated number of OFDM symbols is greater than the initial number of OFDM symbols.

The network interface is further configured to performing tone reordering when the data unit is to be transmitted in a normal mode of operation and not perform tone reordering when the data unit is to be transmitted in a low bandwidth mode of operation.

While the present invention has been described with reference to specific examples, which are intended to be illustrative only and not to be limiting of the invention, changes, additions and/or deletions may be made to the disclosed embodiments without departing from the scope of the claims.

What is claimed is:

1. A method for generating an orthogonal frequency division multiplexing (OFDM) physical layer (PHY) data unit for transmission via a communication channel, the method comprising:
    generating a signal field to include
        a first subfield having one of i) a length indication to indicate a number of bytes in a data portion of the data unit, or ii) a duration indication to indicate a number of OFDM symbols in the data portion of the data unit, and
        a second subfield to indicate whether the first subfield includes the length indication or the duration indication;
    when the second subfield indicates that the first subfield includes the length indication, adding one or more padding bits to a set of information bits to generate a set of padded information bits according to a first padding scheme;
    when the second subfield indicates that the first subfield includes the duration indication, adding one or more padding bits to the set of information bits to generate the set of padded information bits according to a second padding scheme, the second padding scheme different than the first padding scheme;
    encoding the set of padded information bits with one or more binary convolutional coding (BCC) encoders to generate a set of encoded information bits;
    generating a plurality of OFDM symbols to include the set of encoded information bits; and
    generating the data unit to include the plurality of OFDM symbols.

2. The method of claim 1, wherein generating the set of padded information bits according to the first padding scheme includes:
    determining, based on the number of bytes in the data portion, an integer number of OFDM symbols needed to fit the set of information bits after being encoded with one or more BCC encoders;
    determining a number of padding bits needed to be added to the information bits so the set of padded information bits entirely fills the integer number of OFDM symbols; and
    adding the number of padding bits during PHY layer processing of the information bits.

3. The method of claim 1, wherein generating the set of padded information bits according to the second padding scheme includes:
    determining an integer number of OFDM symbols needed to fit the set of information bits after being encoded with one or more BCC encoders;
    determining a total number of padding bits needed to be added to the information bits so the set of padded information bits entirely fills the integer number of OFDM symbols;
    adding a first number of padding bits during MAC layer processing of the information bits to generate a set of MAC padded information bits, wherein the first number of padding bits is determined such that such that set MAC padded information bits entirely fill a greatest integer number of bytes in the determined number OFDM symbols; and
    adding a second number of padding bits during PHY layer processing of the information bits; wherein the second number of padding bits is determined such that a sum of the first number of padding bits and the second number of padding bits equals the total number of padding bits, wherein generating the signal field includes setting the first subfield to the determined integer number of OFDM symbols.

4. The method of claim 1, further comprising adding tail bits to the set of padded information bits after adding padding bits and before encoding information bits with the one or more BCC encoders.

5. The method of claim 1, wherein adding one or more padding bits to the set of information bits to generate the set of padded information bits according to the first padding scheme includes adding at least some non-zero padding bits.

6. An apparatus for generating a PHY data unit for transmission via a communication channel, the apparatus comprising:
    a network interface configured to
        generate a signal field to include:
            a first subfield to having one of i) a length indication to indicate a number of bytes in a data portion of the data unit, or ii) a duration indication to indicate a number of OFDM symbols in the data portion of the data unit; and
            a second subfield to indicate whether the first subfield includes the length indication or the duration indication;
        when the second subfield indicates that the first subfield includes the length indication, add one or more padding bits to a set of information bits to generate a set of padded information bits according to a first padding scheme,
        when the second subfield indicates that the first subfield includes the duration indication, add one or more padding bits to the set of information bits to generate the set of padded information bits according to a second padding scheme, the second padding scheme different than the first padding scheme, encode the set of padded information bits with one or more binary convolutional coding (BCC) encoders to generate a set of encoded information bits, generate a plurality of OFDM symbols to include the set of encoded information bits, and generate the data unit to include the plurality of OFDM symbols.

7. The apparatus of claim 6, wherein the network interface is configured to generate the set of padded information bits according to the first padding scheme at least by:

determining, based on the number of bytes in the data portion, an integer number of OFDM symbols needed to fit the set of information bits after being encoded with one or more BCC encoders;

determining a number of padding bits needed to be added to the information bits so the set of padded information bits entirely fills the integer number of OFDM symbols; and adding the number of padding bits during PHY layer processing of the information bits.

8. The apparatus of claim 6, wherein the network interface is configured to generate the set of padded information bits according to the second padding scheme at least by:

determining an integer number of OFDM symbols needed to fit the set of information bits after being encoded with one or more BCC encoders;

determining a total number of padding bits needed to be added to the information bits so the set of padded information bits entirely fills the integer number of OFDM symbols;

adding a first number of padding bits during MAC layer processing of the information bits to generate a set of MAC padded information bits, wherein the first number of padding bits is determined such that such that set MAC padded information bits entirely fill a greatest integer number of bytes in the determined number OFDM symbols; and adding a second number of padding bits during PHY layer processing of the information bits; wherein the second number of padding bits is determined such that a sum of the first number of padding bits and the second number of padding bits equals the total number of padding bits, wherein the network interface is configured to set the first subfield to indicate the determined integer number of OFDM symbols.

9. The apparatus of claim 6, wherein the network interface is further configured to add tail bits to the set of padded information bits after adding padding bits and before encoding information bits with the BCC encoder.

10. The apparatus of claim 6, wherein the network interface is configured to, when adding one or more padding bits to the set of information bits to generate the set of padded information bits according to the first padding scheme, add at least some non-zero padding bits.

11. A method for generating an orthogonal frequency division multiplexing (OFDM) physical layer (PHY) data unit for transmission via a communication channel, the method comprising:

generating a signal field to include a first subfield having one of i) a length indication to indicate a number of bytes in a data portion of the data unit, or ii) a duration indication to indicate a number of OFDM symbols in the data portion of the data unit, and a second subfield to indicate whether the first subfield includes the length indication or the duration indication;

when the second subfield indicates that the first subfield includes the length indication, adding one or more padding bits to a set of information bits to generate a set of padded information bits according to a first padding scheme;

when the second subfield indicates that the first subfield includes the duration indication, adding one or more padding bits to the set of information bits to generate the set of padded information bits according to a second padding scheme, the second padding scheme different than the first padding scheme;

encoding the set of padded information bits with one or more low density parity check (LDPC) encoders to generate a set of encoded information bits;

generating a plurality of OFDM symbols to include the set of encoded information bits; and generating the data unit to include the plurality of OFDM symbols.

12. The method of claim 11, wherein generating the padded information bits according to the first padding scheme includes:

determining, based on the number of bytes in the data portion, an initial integer number of OFDM symbols needed to fit the set of information bits after being encoded with one or more LDPC encoders;

determining a number of padding bits needed to be added to the set of information bits so the padded information bits entirely fill the initial integer number of OFDM symbols;

adding the number of padding bits during PHY layer processing of the information bits; and determining an updated number of OFDM symbols after encoding the padded information bits, and wherein generating the signal field includes setting the first subfield to indicate the updated number of OFDM symbols.

13. The method of claim 11, wherein generating the signal field further comprises including a third subfield to indicate whether the updated number of OFDM symbols is greater than the initial number of OFDM symbols.

14. The method of claim 11, wherein generating the padded information bits according to the second padding scheme includes:

determining an initial integer number of OFDM symbols needed to fit the set of information bits after being encoded with one or more LDPC encoders;

determining a total number of padding bits needed to be added to the information bits so the set of padded information bits entirely fills the initial integer number of OFDM symbols;

adding a first number of padding bits during MAC layer processing of the information bits to generate a set of MAC padded information bits, wherein the first number of padding bits is determined such that such that set MAC padded information bits entirely fill a greatest integer number of bytes in the determined number OFDM symbols;

adding a second number of padding bits during PHY layer processing of the information bits; wherein the second number of padding bits is determined such that a sum of the first number of padding bits and the second number of padding bits equals the total number of padding bits; and determining an updated number of OFDM symbols needed to fit encoded padded information bits, wherein generating the signal field includes setting the first subfield to indicate the updated number of OFDM symbols.

15. The method of claim 14, wherein generating the signal field further comprises including a third subfield to indicate whether the updated number of OFDM symbols is greater than the initial number of OFDM symbols.

16. The method of claim 11, further comprising performing tone reordering when the data unit is to be transmitted in a normal mode of operation and omitting tone reordering when the data unit is to be transmitted in a low bandwidth mode of operation.

17. An apparatus for generating a PHY data unit for transmission via a communication channel, the apparatus comprising:
a network interface configured to
generate a signal field to include
a first subfield to include one of i) a length indication to indicate a number of bytes in a data portion of the data unit and ii) a duration indication to indicate a number of OFDM symbols in the data portion of the data unit, and
a second subfield to indicate whether the first subfield includes the length indication or the duration indication,
when the second subfield indicates that the first subfield includes the length indication, add one or more padding bits to a set of information bits to generate a set of padded information bits according to a first padding scheme,
when the second subfield indicates that the first subfield includes the duration indication, add one or more padding bits to the set of information bits to generate the set of padded information bits according to a second padding scheme, the second padding scheme different than the first padding scheme,
encode the set of padded information bits with one or more low density parity check (LDPC) encoders to generate a set of encoded information bits,
generate a plurality of OFDM symbols to include the set of encoded information bits, and
generate the data unit to include the plurality of OFDM symbols.

18. The apparatus of claim 17, wherein the network interface is configured to generate the set of padded information according to the first padding scheme at least by:
determining, based on the number of bytes in the data portion, an initial integer number of OFDM symbols needed to fit the set of information bits after being encoded with one or more LDPC encoders;
determining a number of padding bits needed to be added to the set of information bits so the padded information bits entirely fill the initial integer number of OFDM symbols;
adding the number of padding bits during PHY layer processing of the information bits,
determining an updated number of OFDM symbols after encoding the padded information bits; and
wherein the network interface is configured to set the first subfield to indicate the updated number of OFDM symbols.

19. The apparatus of claim 17, wherein the network interface is configured to generate the signal field to further include a third subfield to indicate whether the updated number of OFDM symbols is greater than the initial number of OFDM symbols.

20. The apparatus of claim 17, wherein the network interface is configured to generate the set of padded information bits according to the second padding scheme at least by:
determining an initial integer number of OFDM symbols needed to fit the set of information bits after being encoded with one or more LDPC encoders;
determining a total number of padding bits needed to be added to the information bits so the set of padded information bits entirely fills the initial integer number of OFDM symbols;
adding a first number of padding bits during MAC layer processing of the information bits to generate a set of MAC padded information bits, wherein the first number of padding bits is determined such that such that set MAC padded information bits entirely fill a greatest integer number of bytes in the determined number OFDM symbols;
adding a second number of padding bits during PHY layer processing of the information bits; wherein the second number of padding bits is determined such that a sum of the first number of padding bits and the second number of padding bits equals the total number of padding bits; and
determining an updated number of OFDM symbols needed to fit encoded padded information bits,
wherein the network interface is configured to set the first subfield in to indicate the updated number of OFDM symbols.

21. The apparatus of claim 20, wherein the network interface is configured to generate the signal field to further include a third subfield to indicate whether the updated number of OFDM symbols is greater than the initial number of OFDM symbols.

22. The apparatus of claim 17, wherein the network interface is further configured to performing tone reordering when the data unit is to be transmitted in a normal mode of operation and not perform tone reordering when the data unit is to be transmitted in a low bandwidth mode of operation.

* * * * *